United States Patent [19]

Takeda

[11] Patent Number: 5,737,336
[45] Date of Patent: Apr. 7, 1998

[54] SIGNAL PROCESSING APPARATUS AND SIGNAL PROCESSING METHOD FOR THE SAME

[75] Inventor: Kazuhiko Takeda, Sendai, Japan

[73] Assignee: Fujitsu Limited, Kanagawa, Japan

[21] Appl. No.: 525,825

[22] Filed: Sep. 8, 1995

[30] Foreign Application Priority Data

Feb. 20, 1995 [JP] Japan ................. 7-031179

[51] Int. Cl.$^6$ ................. H04J 3/04
[52] U.S. Cl. ................. 370/539; 370/337; 370/510; 370/536
[58] Field of Search ................. 370/539, 535, 370/509, 463, 458, 347, 345, 341, 329, 265, 337, 516, 524, 536, 510

[56] References Cited

U.S. PATENT DOCUMENTS

| | | | |
|---|---|---|---|
| 5,333,132 | 7/1994 | Chuniaud et al. | 370/536 |
| 5,467,353 | 11/1995 | Fukuda | 370/524 |
| 5,528,609 | 6/1996 | Asano | 370/516 |
| 5,530,704 | 6/1996 | Gibbons et al. | 370/510 |
| 5,561,846 | 10/1996 | Hagio | 370/337 |

Primary Examiner—Douglas W. Olms
Assistant Examiner—Shick Hom
Attorney, Agent, or Firm—Helfgott & Karas, P.C.

[57] ABSTRACT

The invention relates to a signal processing apparatus and a signal processing method. The channel unit of the apparatus includes a plurality of channel data sending units to transmit a plurality of sets of channel data to a multiplexing unit. Part of the channel data sending units are connected to the timing signal line so that channel data from these channel data sending units are inserted into empty slots of the timing signals and are transmitted to the multiplexing unit through the timing signal line. The multiplexing unit of the apparatus includes a channel data separating unit for separating the channel data from the timing signals, and a channel data multiplexing unit for multiplexing the channel data transmitted through the data signal line and the channel data separated by the channel data separating unit. With this structure, data can be superposed on the timing signals used for data insertion and data extraction, thereby greatly increasing the number of channels included in the channel unit.

12 Claims, 18 Drawing Sheets

SIGNAL PROCESSING APPARATUS AND SIGNAL PROCESSING METHOD FOR THE SAME

BACKGROUND OF THE INVENTION

1) Field of the Invention

The present invention relates to a signal processing apparatus including channel units each including a plurality of channels for a plurality of telephone subscribers, and a multiplexing/demultiplexing unit for multiplexing and demultiplexing a plurality of channel data which are exchanged between the channel units. The present invention also relates to a signal processing method used in such a signal processing apparatus.

2) Description of the Related Art

FIG. 15 is a block diagram showing the structure of a typical signal processing apparatus. In FIG. 15, numerals 101–112 denote channel units each including channels (CH1 and CH2) for two telephone terminals (subscribers) 500A and 500B, numeral 200 denotes a multiplexing/demultiplexing unit, numeral 300 denotes a data signal line for transmitting channel data from the channel units 101–112 to the multiplexing/demultiplexing unit 200, and numeral 400 denotes a timing signal line for supplying timing signals from the multiplexing/demultiplexing unit 200 to the channel units 101–112.

Each of the channel units 101–112 inserts and extracts channel data corresponding to the subscribers 500A and 500B, and is connected to the multiplexing/demultiplexing unit 200 to receive only a selected pair of clock pulses (timing signals) among clock pulses CCS(CCR)1 to CCS(CCR)6, and a selected pair of shift pulses (timing signals) among shift pulses SHS(SHR)1 to SHS(SHR)4. For example, when both the timing signals become a "LOW" level, the insertion and extraction of the channel data is performed so that data corresponding to the subscribers 500A and 500B of each of the channel units 101–112 are transmitted.

As shown in FIG. 16, each of the channel units 101–112 is composed of a receiving system 120 and a sending system 130. The receiving system 120 includes speed converting units 121 and 122, a CH1 data extracting unit 123 for channel 1, a CH2 data extracting unit 124 for channel 2, timing generating units 125 and 126, and AND gates 127 and 128. The sending system 130 includes speed converting units 131 and 132, a CH1 data sending unit 133 for channel 1, a CH2 data sending unit 134 for channel 2, timing generating units 135 and 136, and AND gates 137 and 138.

In the receiving system 120, the AND gate 127 obtains the logical product of the inverse of clock pulse CCR1 (or CCR3, CCR5) and the inverse of shift pulse SHR1 (or SHR2–SHR4), and the AND gate 128 obtains the logical product of the inverse of clock pulse CCR2 (or CCR4, CCR6) and the inverse of shift pulse SHR1 (or SHR2–SHR4).

The timing generating units 125 and 126 respectively receive the outputs of the AND gates 127 and 128 and output them, as timing signals used for the extraction of channel data in the CH1 data extracting unit 123 and the CH2 data extracting unit 124.

The CH1 data extracting unit 123 takes in reception channel data (VFR) in accordance with the timing of the timing signal output from the timing generating unit 125 to extract data for channel 1 (CH1) and outputs the extracted data. Similarly, the CH2 data extracting unit 124 takes in the reception channel data (VFR) in accordance with the timing of the timing signal output from the timing generating unit 126 to extract data for channel 2 (CH2) and outputs the extracted data.

The speed converting units 121 and 122 convert the speed of data transmission for channel data output from the CH1 data extracting unit 123 and the CH2 data extracting unit 124. For example, in the speed converting unit 121, voice data having a transmission speed of 1.5 Mbps output from the CH1 data extracting unit 123 is converted into voice data having a transmission speed of 64 kbps.

In the sending system 130, the speed converting units 131 and 132 convert the speed of data transmission for transmission data. As in the receiving system 130, the CH1 data sending unit 133 outputs transmission channel data in accordance with the timing signal obtained by the AND gate 137 and the timing generating unit 135. The CH2 data sending unit 134 outputs transmission channel data in accordance with the timing signal obtained by the AND gate 138 and the timing generating unit 136. The outputs of these data sending units 133 and 134 are multiplexed to be sent through a single line.

As shown in FIG. 17, the multiplexing/demultiplexing unit 200 multiplexes channel data from 24 channels in the channel units 101–112 to obtain VFS (sending-side), and separates VFR (receiving-side) to obtain channel data for 24 channels in the channel units 101–112. The multiplexing/demultiplexing unit 200 also generates the above-described timing signals [clock pulses CCS(CCR)1–CCS(CCR)6 and shift pulses SHS(SHR)1–SHS(SHR)4].

The multiplexing/demultiplexing unit 200 is composed of a receiving system 210 and a sending system 220. The receiving system 210 includes a demultiplexing (DMUX) and speed converting unit 211, a phase adjusting unit 212, a multiplexing unit (MUX) 213, a receiving-side (R-side) timing generating unit 214, and a receiving-side channel (CH) pulse generating unit 215. The sending system 220 includes a demultiplexing unit (DMUX) 221, a phase adjusting unit 222, a multiplexing (MUX) and speed converting unit 223, a sending-side (S-side) timing generating unit 224, and a sending-side channel pulse generating unit 225.

In the receiving system 210, the demultiplexing and speed converting unit 211 converts the transmission speed of received channel data to be transmitted to the channel units 101–112 and separates the data into a plurality of sets of channel data, the number of the sets corresponding to the number of channels. In this case, the received data are separated into two sets of channel data for two channels CH1 and CH2, which are then output.

The phase adjusting unit 212 performs phase adjustment for each set of channel data output from the demultiplexing and speed converting unit 211 to synchronize the phase of each set of channel data. The multiplexing unit 213 again multiplexes the channel data separated in the demultiplexing and speed converting unit 211 to output data to be transmitted through a single line.

The receiving-side timing generating unit 214 responds to a frame timing signal and clocks to generate timing signals such that the various units (the DMUX and speed converting unit 211, the phase adjusting unit 212, and the MUX 213) operate, for example, according to a time frame of 125 microseconds, as shown in FIG. 18. The receiving-side channel pulse generating unit 215 responds to the output from the receiving-side timing generating unit 214 to output timing pulses CCR1–CCR6 and timing pulses SHR1–SHR4. These timing signals are output to the receiving system 120 of each of the channel units 101–112 (see FIG. 16).

Meanwhile, in the sending system 220, the demultiplexing unit 221 separates the transmission channel data VFS into data for two lines and outputs them. The phase adjusting unit 222 performs phase adjustment for the transmission channel data, which have been separated into data for two lines. The multiplexing and speed converting unit 223 converts the transmission speed of the transmission channel data and multiplexes the data for two lines to obtain data to be transmitted through a single line.

Like the above-described receiving-side timing generating unit 214, the sending-side timing generating unit 224 supplies timing signals to the various units (the DMUX 221, the phase adjusting unit 222, and the speed converting unit 223). The sending-side channel pulse generating unit 225 responds to the output from the sending-side timing generating unit 224 to output timing pulses CCS1–CCS6 and timing pulses SHS1–SHS4. These timing signals are output to the sending system 110 of each of the channel units 101–112 (see FIG. 16).

In the signal processing apparatus having the above-described structure, it is assumed that data (voice data in this case) from the telephone terminals (subscribers) 500A (CH1) and 500B (CH2) are received by the channel units 101–112, for example. In the channel unit 101, the transmission speed of the data is converted by the speed converting units 131 and 132 (for example, from 64 kbps to 1.5 Mbps), and the data are output to the CH1 data sending unit 133 and the CH2 data sending unit 134, respectively.

At this time, the AND gate 137 receives as inputs the inverse of the clock pulse CCS1 (see FIG. 18) and the inverse of the shift pulse SHS1 (see FIG. 18) among the timing signals supplied from the multiplexing/demultiplexing unit 200. Accordingly, a high level signal is output from the AND gate 137 when the timing pulses CCS1 and SHS1 both become a "Low" level. This signal is transmitted, as a timing signal, to the CH1 data sending unit 133 via the timing generating unit 125.

The CH1 data sending unit 133 sends channel data in accordance with the timing of the timing signal supplied thereto, so that channel data corresponding to the subscriber 500A (CH1) of the channel unit 101 are transmitted.

Similarly, channel data corresponding to the subscriber 500B (CH2) are transmitted via the CH2 data sending unit 134 when the clock pulse CCS2 (see FIG. 18) and the shift pulse SHS1 (see FIG. 18) both become a "Low" level.

The processing in other channel units 102–112 is the same as that in the channel unit 101. That is, when the AND gate 137 or 138 detects that the timing pulse CCS3–CCS6 (see FIG. 18) and the timing pulse SHS1–SHS4 (see FIG. 18) both become a "Low" level, data corresponding to the channel CH1 or CH2 of each channel unit 102–112 are transmitted, as transmission channel data (VFS), from the data sending unit 133 or 134 to the multiplexing/demultiplexing unit 200.

In the multiplexing/demultiplexing unit 200, transmission channel data are subjected to demultiplexing, phase adjustment and speed converting, in a frame-by-frame fashion, by the DMUX 221, the phase adjusting unit 222 and the speed converting unit 223 in accordance with timing signals which are supplied from the sending-side timing generating unit 224 of the sending system 220 at intervals of 125 microseconds.

When the subscribers 500A and 500B receive channel data, reverse processing is performed. That is, received channel data are subjected to speed conversion, phase adjustment and multiplexing, in a frame-by-frame fashion, by the speed converting unit 211, the phase adjusting unit 212 and the MUX 213 in accordance with timing signals which are supplied from the receiving-side timing generating unit 214 of the receiving system 210 at intervals of 125 microseconds. The multiplexed data are transmitted to the channel units 101–112.

In the channel unit 101, for example, when the AND gate 127 or 128 detects that the timing pulse CCR1, CCR2 (see FIG. 18) and the timing pulse SHR1 (see FIG. 18) both become a "Low" level, data corresponding to the channel CH1 or CH2 of each channel unit 102–112 are extracted by the data extracting unit 123 or 124, and are transmitted after speed conversion by the speed converting units 121 and 122.

In the other channel units 102–112, when the clock pulse CCR3–CCR6 (see FIG. 18) and the shift pulse SHR1–SHR4 (see FIG. 18) both become a "Low" level, data corresponding to the channel CH1 or CH2 of each channel unit 102–112 are extracted by the data extracting unit 123 or 124 and are transmitted after speed conversion by the speed converting units 121 and 122.

In the above-described signal processing apparatus, the insertion and extraction of channel data corresponding to each channel is performed in accordance with 24 kinds of combinations of the clock pluses CCS/R1–6 and the shift pulses SHS/R1–4, i.e., the combinations in which both the signals become a "Low" level.

However, in the signal processing apparatus as described above, the time slot of VFS/VFR used for transmitting data is already full, as shown in FIG. 18. Accordingly, to increase the number of subscribers included in each of the channel units 101–112, it is necessary to increase the operational speed of the apparatus or to provide additional channel units or a data signal line, which would increase costs due to an increase in the purchase cost of the apparatus and the installation space, and which would also affect the operation of the existing channel units 101–112.

SUMMARY OF THE INVENTION

In view of the foregoing problems, an object of the present invention is to provide a signal processing apparatus and a signal processing method in which data are superposed on timing signals used for data insertion and data extraction, thereby greatly increasing the number of channels included in each channel unit while allowing the existing channel units to be continuously used.

In order to attain the object described above, the present invention provides a signal processing apparatus which has a channel unit including a plurality of channels, a multiplexing unit for multiplexing a plurality of sets of channel data from the channel unit, a data signal line for transmitting the channel data from the channel unit to the multiplexing unit, and a timing signal line for transmitting timing signals from the multiplexing unit to the channel unit. The channel unit includes a plurality of channel data sending units to transmit the plurality of sets of channel data to the multiplexing unit while using the timing signals input through the timing signal line to determine the timing of sending out the data. Part of the channel data sending units are connected to the data signal line so that channel data from part of the channel data sending units are transmitted to the multiplexing unit through the data signal line, and the rest of the channel data sending units are connected to the timing signal line so that channel data from the rest of the channel data sending units are inserted into empty slots of the timing signals and are transmitted to the multiplexing unit through the timing signal line. The multiplexing unit includes a channel data separating unit for separating the channel data from the timing signals transmitted through the timing signal line, and a channel data multiplexing unit for multiplexing the channel data transmitted through the data signal line and the channel data separated by the channel data separating unit.

Accordingly, in the signal processing apparatus of the present invention, the number of channels included in the channel unit can greatly be increased in an extremely easy manner, without affecting the existing channels included in the channel unit and without installing additional channel units.

The present invention also provides a signal processing apparatus which has a channel unit including a plurality of channels, a demultiplexing unit for demultiplexing received data to obtain a plurality of sets of channel data to be transmitted to the channel unit, a data signal line for transmitting the channel data from the demultiplexing unit to the channel unit, and a timing signal line for transmitting timing signals from the demultiplexing unit to the channel unit. The demultiplexing unit includes a channel data demultiplexing unit for demultiplexing received data to obtain a plurality of sets of channel data to be transmitted to the channel unit. The demultiplexing unit has a structure such that part of the channel data demultiplexed by the channel data demultiplexing unit are transmitted through the data signal line, and the rest of the channel data demultiplexed by the channel data demultiplexing unit are inserted into empty slots of the timing signals and are transmitted through the timing signal line. The channel unit includes a plurality of channel data extracting units to extract the plurality of sets of channel data input through the data signal line and the timing signal line while using the timing signals input through the timing signal line to determine the timing of extraction.

Accordingly, in the above-described signal processing apparatus of the present invention, the number of channels included in the channel unit can greatly be increased in an extremely easy manner, without affecting the existing channels included in the channel unit and without installing additional channel units.

The present invention further provides a signal processing apparatus which has a channel unit including a plurality of channels, a multiplexing/demultiplexing unit for multiplexing and separating a plurality of sets of channel data transmitted from or to the channel unit, a data signal line for transmitting the channel data between the channel units and the multiplexing/demultiplexing unit, and a timing signal line for transmitting timing signals from the multiplexing/demultiplexing unit to the channel units. Each of the channel unit and the multiplexing/demultiplexing unit includes a channel data sending processing unit and a channel data receiving processing unit. The channel data sending processing unit of the channel unit includes a plurality of channel data sending units to transmit the plurality of sets of channel data to the multiplexing/demultiplexing unit while using the timing signals input through the timing signal line to determine the timing of sending out the data. Part of the channel data sending units are connected to the data signal line so that channel data from part of the channel data sending units are transmitted to the multiplexing/demultiplexing unit through the data signal line, and the rest of the channel data sending units are connected to the timing signal line so that channel data from the rest of the channel data sending units are inserted into empty slots of the timing signals and are transmitted to the multiplexing/demultiplexing unit through the timing signal line. The channel data receiving processing unit of the multiplexing/demultiplexing unit includes a channel data separating unit for separating the channel data from the timing signals transmitted through the timing signal line, and a channel data multiplexing unit for multiplexing the channel data transmitted through the data signal line and the channel data separated by the channel data separating unit. The channel data sending processing unit of the multiplexing/demultiplexing unit includes a channel data demultiplexing unit for demultiplexing received data to obtain a plurality of sets of channel data to be transmitted to the channel unit. The demultiplexing unit has a structure such that part of the channel data separated by the channel data demultiplexing unit are transmitted through the data signal line, and the rest of the channel data separated by the channel data demultiplexing unit are inserted into empty slots of the timing signals and are transmitted through the timing signal line. The channel data receiving processing unit of the channel unit includes a plurality of channel data extracting units to extract the plurality of sets of channel data input through the data signal line and the timing signal line while using the timing signals input through the timing signal line to determine the timing of extracting the data.

Accordingly, in the above-described signal processing apparatus of the present invention, the number of channels included in the channel unit can greatly be increased in an extremely easy manner, without affecting the existing channels included in the channel unit and without installing additional channel units.

Also, the present invention provides a signal processing method for a signal processing apparatus which has a plurality of channel units each including a plurality of channels, a multiplexing/demultiplexing unit for multiplexing and separating a plurality of sets of channel data transmitted between the channel units, a data signal line for transmitting the channel data between the channel unit and the multiplexing/demultiplexing unit, and a timing signal line for transmitting timing signals from the multiplexing/demultiplexing unit to the channel unit. In each channel unit, part of the plurality of sets of channel data are transmitted from the channel unit to the multiplexing/demultiplexing unit through the data signal line, and the rest of the plurality of sets of channel data are inserted into empty slots of the timing signals and are transmitted to the multiplexing/demultiplexing unit through the timing signal line. In the multiplexing/demultiplexing unit, the channel data are separated from the timing signals transmitted through the timing signal line, and the separated channel data and the channel data transmitted through the data signal line are multiplexed. In the multiplexing/demultiplexing unit, received data are separated to obtain a plurality of sets of channel data, and part of the demultiplexed channel data are transmitted through the data signal line while the rest of the demultiplexed channel data are inserted into empty slots of the timing signals and transmitted through the timing signal line. In each channel unit, the plurality of sets of channel data input through the data signal line and the timing signal line are extracted while using the timing signals input through the timing signal line to determine the timing of extraction.

Accordingly, in the above-described signal processing method of the present invention, the number of channels included in the channel unit can greatly be increased in an extremely easy manner, without affecting the existing channels included in the channel unit and without installing additional channel units.

DESCRIPTION OF THE PREFERRED EMBODIMENTS a) Aspect of the Invention

An aspect of the present invention will be described with reference to FIG. 1.

Figure 1:
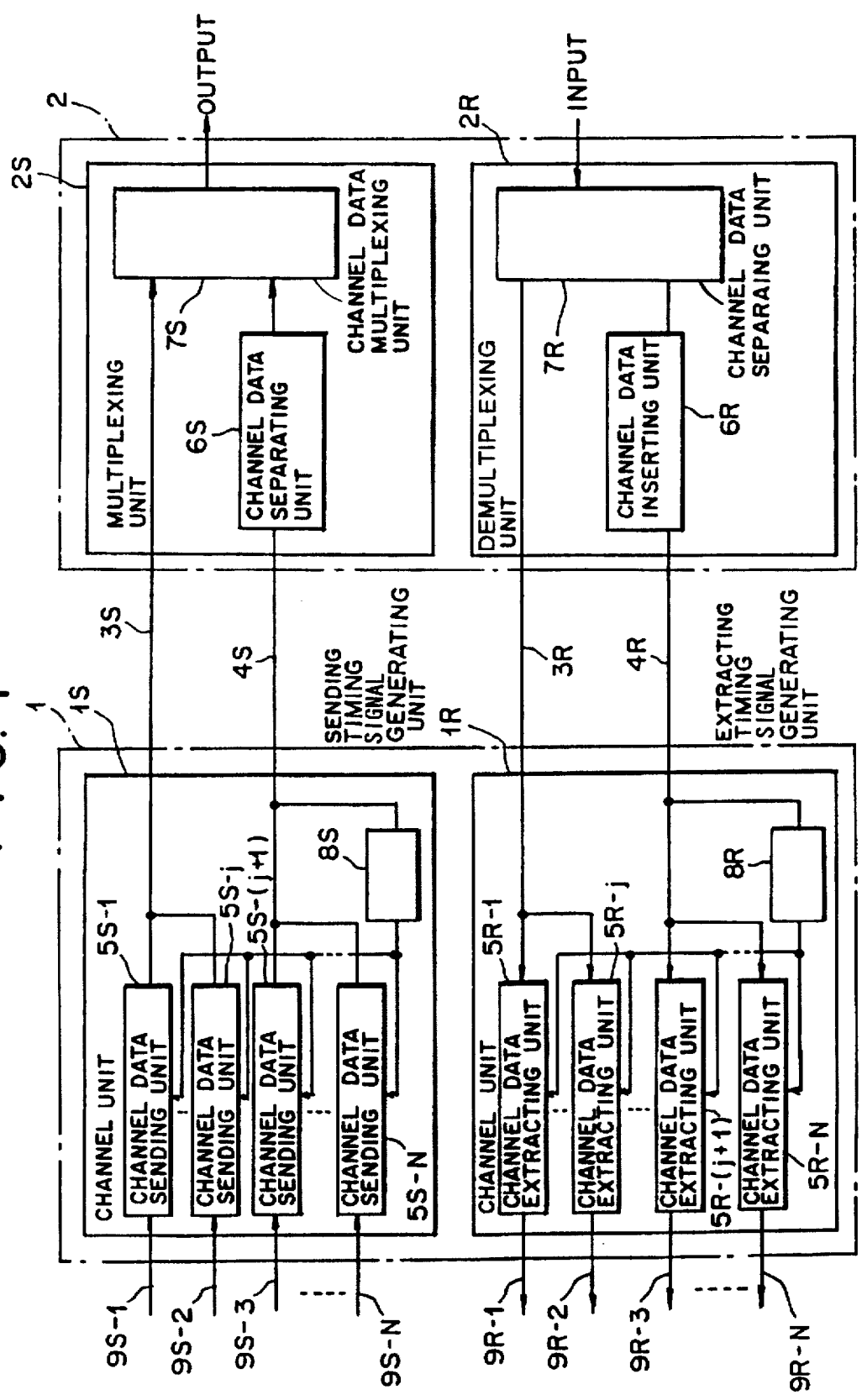
FIG. 1 is a block diagram illustrating an aspect of the present invention.

FIG. 1 is a block diagram showing the aspect of the present invention. In FIG. 1, numeral 1S denotes a channel unit including a plurality of channels 9S-1 to 9S-N (N is a natural number), numeral 2S denotes a multiplexing unit for multiplexing a plurality of sets of channel data from the channel unit 1S, numeral 3S denotes a data signal line for transmitting channel data from the channel unit 1S to the multiplexing unit 2S, and numeral 4S denotes a timing signal line for transmitting timing signals from the multiplexing unit 2S to the channel unit 1S.

As shown in FIG. 1, the channel unit 1S includes a plurality of channel data sending units 5S-1 to 5S-N. Channel data sending units 5S-1 to 5S-j (j is a natural number satisfying the inequality j<N) among the plurality of channel data sending units 5S-1 to 5S-N are connected to the data signal line 3S, and the other channel data sending units 5S-(j+1) to 5S-N are connected to the timing signal line 4S.

The plurality of channel data sending units 5S-1 to 5S-N transmit the plurality of sets of channel data to the multiplexing unit 2S while using the timing signals transmitted through the timing signal line 4S to determine the timing of the transmitting operation. Channel data from the channel data sending units 5S-1 to 5S-j among the plurality of channel data sending units 5S-1 to 5S-N are transmitted to the multiplexing unit 2S through the data signal line 3S, and channel data from the remaining channel data sending units 5S-(j+1) to 5S-N are inserted into empty slots of the timing signals and transmitted to the multiplexing unit 2S via the timing signal line 4S.

The multiplexing unit 2S includes a channel data separating unit 6S and a channel data multiplexing unit 7S.

The channel data separating unit 6S separates channel data from the timing signals transmitted through the timing signal line 4S. The channel data multiplexing unit 7S multiplexes the channel data transmitted through the data signal line 3S and the channel data separated by the channel data separating unit 6S.

Also, a sending timing signal generating unit 8S is provided to allow the plurality of channel data sending units 5S-1 to 5S-N to use the timing signals input through the timing signal line 4S to determine the timing of the transmitting operation. The sending timing signal generating unit 8S generates the sending timing signals for the channel data sending units 5S-1 to 5S-N based on the timing signals input through the timing signal line 4S.

In FIG. 1, numeral 1R denotes a channel unit including a plurality of channels 9R-1 to 9R-N, numeral 2R denotes a demultiplexing unit for separating received data to obtain a plurality of sets of data to be transmitted to the channel unit 1R, numeral 3R denotes a data signal line for transmitting data from the demultiplexing unit 2R to the channel unit 1R, and numeral 4R denotes a timing signal line for transmitting timing signals from the demultiplexing unit 2R to the channel unit 1R.

The demultiplexing unit 2R includes a channel data demultiplexing unit 7R and a channel data inserting unit 6R.

The channel data demultiplexing unit 7R demultiplexes received data to obtain a plurality of sets of channel data to be transmitted to the channel unit 1R. Part of the channel data separated by the channel data demultiplexing unit 7R are transmitted through the data signal line 3R. The channel data inserting unit 6R inserts into empty slots of the timing signals the rest of the channel data separated by the channel data demultiplexing unit 7R and transmits the rest of the channel data through the timing signal line 4R.

The channel unit 1R includes a plurality of channel data extracting units 5R-1 to 5R-N. The plurality of channel data extracting units 5R-1 to 5R-N extract channel data input through the data signal line 3R and the timing signal line 4R while using the timing signals input through the timing signal line 4R to determine the timing of the extracting operation.

To this end, an extracting timing signal generating unit 8R is provided which generates extracting timing signals for the channel data extracting units 5R-1 to 5R-N based on the timing signals input through the timing signal line 4R.

Moreover, the signal processing apparatus shown in FIG. 1 may be constructed to have a channel unit 1 which includes both the channel units 1S and 1R, and a multiplexing/demultiplexing unit 2 which includes both the multiplexing units 2S and 2R. In this case, the channel unit 1S and the multiplexing unit 2R are provided, as channel data sending processing units, in the channel unit 1 and the multiplexing/demultiplexing unit 2, respectively, while the channel unit 1R and the multiplexing unit 2S are provided, as channel data receiving processing units, in the channel unit 1 and the multiplexing/demultiplexing unit 2, respectively.

In the signal processing method used in the above-described signal processing apparatus according to the present invention, part of the plurality of sets of channel data are transmitted to the multiplexing/demultiplexing unit 2 thought the data signal line 3S while the rest of the plurality of sets of channel data are inserted into empty slots of the timing signals and transmitted to the multiplexing/demultiplexing unit 2 via the timing signal line.

In the multiplexing unit 2S, the channel data transmitted through the timing signal line 4S are separated from the timing signals by the channel data separating unit 6S. The channel data thus separated and the channel data transmitted through the data signal line 3S are then multiplexed.

Also, in the multiplexing/demultiplexing unit 2, received channel data are separated by the channel data demultiplexing unit 7R, and part of the channel data are transmitted through the data signal line 3R while the rest of the channel data are inserted into empty slots of the timing signals and transmitted through the timing signal line 4R.

In each of the channel units 1S and 1R, the plurality of sets of data input through the data signal line 3S or 3R and the timing signal line 4S or 4R are extracted by using the timing signals input through the timing signal line 4S or 4R to determine the timing of the extracting operation.

The above-described plurality of channel units 1S and 1R are divided into a plurality of groups, and the leading positions of a plurality of sets of channel data handled by channel units 1S, 1R forming each group are made coincide with each other while the leading positions of a plurality of sets of channel data handled by channel units forming another group are shifted by a predetermined amount. Accordingly, channel data handled by channel units forming each group can be discriminated from channel data handled by channel units forming other groups.

In this case, a signal indicating the leading position of the channel data handled by each channel unit 1S, 1R and timing signals may be supplied continuously. Also, the signal indicating the leading position of the channel data handled by each channel unit 1S, 1R and part of a plurality of kinds of timing signals may be supplied continuously.

When the signal indicating the leading position of the channel data handled by the channel unit 1S, 1R and part of a plurality of kinds of timing signals are supplied continuously, the channel data are identified as multiframe data in the channel unit 1S, 1R.

Also, multiframe information may be inserted into channel data which is transmitted from the multiplexing/demultiplexing unit 2 to the channel unit 1 through the data signal line 3R, and a signal indicating the leading position of the channel data handled by the channel unit 1 may be transmitted through the timing signal line 4R. In this case, the channel data are identified as multiframe data in the channel unit 1 based on the multiframe information and the signal indicating the leading position.

According to the above-described signal processing apparatus and the signal processing method of the present invention, it becomes possible to cause the channel data sending units 5S-(j+1) to 5S-N connected to the timing signal line 4S to insert channel data into empty slots of the timing signals and transmit them to the multiplexing unit 2S through the timing signal line 4S, and to cause the channel data separating unit 6S of the multiplexing unit 2S to separate the channel data from the timing signals transmitted through the timing signal line 4S, which data are then multiplexed for transmission together with channel data transmitted through the data signal line 3S.

Accordingly, the number of channels included in the channel unit 1S can greatly be increased in an extremely easy manner, without affecting the existing channels included in the channel 1S and without installing additional channel units 1S.

Also, since the sending timing signal generating unit 8S can generate sending timing signals for the channel data sending units 5S-1 to 5S-N based on the timing signals input through the timing signal line 4S, the channel data sending units 5S-(j+1) to 5S-N can reliably insert channel data into empty slots of the timing signals.

Moreover, according to the above-described signal processing apparatus and the signal processing method of the present invention, it becomes possible to cause the channel data demultiplexing unit 7R of the multiplexing/demultiplexing unit 2 to separate received channel data and to transmit part of the channel data through the data signal line 3R and to cause the channel data inserting unit 6R to insert the rest of the channel data into empty slots of the timing signals and transmit them through the timing signal line 4R. Accordingly, in the channel unit 1R, a plurality of sets of channel data input through the data signal line 3R and the timing signal line 4R can be extracted in the channel data extracting units 5R-1 to 5R-N while using the timing signals input through the timing signal line 4R to determine the timing of the extracting operation.

Accordingly, even in this case, the number of channels included in the channel unit can greatly be increased in an extremely easy manner, without affecting the existing channels included in the channel and without installing additional channel units.

Also, in the signal processing apparatus of the present invention, the extracting timing signal generating unit 8R can generate extracting timing signals for the channel data extracting units 5R-1 to 5R-N based on the timing signals input through the timing signal line 4R. Hence, the channel data extracting units 5R-(j+1) to 5R-N can reliably extract channel data from the timing signals transmitted through the timing signal line 4R.

Also, according to the signal processing method of the present invention, the above-described plurality of channel units 1 are divided into a plurality of groups, and the leading positions of a plurality of sets of channel data handled by channel units forming each group are made coincide with each other while the leading positions of a plurality of sets of channel data handled by channel units forming another group are shifted by a predetermined amount. Accordingly, channel data handled by channel units forming each group can be discriminated from channel data handled by channel units forming another group, so that the insertion and extraction of channel data into and from the timing signals can easily be performed.

Also, even when a signal indicating the leading position of the channel data handled by the channel unit 1 and the timing signals are supplied continuously or when the signal indicating the leading position of the channel data handled by the channel unit 1 and part of a plurality of kinds of timing signals are supplied continuously, channel data handled by channel unit forming each group can be discriminated from channel data handled by channel units forming another group, so that the insertion and extraction of channel data into and from the timing signals can easily be performed.

Moreover, in the signal processing method of the present invention, when the signal indicating the leading position of the channel data handled by the channel unit 1 and part of a plurality of kinds of timing signals are supplied continuously, the channel data are identified as multiframe data in the channel unit. Accordingly, the insertion and extraction of channel data into and from the timing signals can be performed more easily.

Also, according to the signal processing method of the present invention, multiframe information is inserted into channel data which is transmitted from the multiplexing/ demultiplexing unit 2 to the channel unit 1 through the data signal line 3R, and a signal indicating the leading position of the channel data handled by the channel unit 1 is transmitted through the timing signal line 4R. In this case, the channel data are identified as multiframe data in the channel unit 1 based on the multiframe information and the signal indicating the leading position. Accordingly, the insertion and extraction of channel data into and from the timing signals can be performed considerably easily by using normal timing signals only.

b) Embodiment of the Invention

A preferred embodiment of the present invention will now be described with reference to the accompanying drawings.

Figure 2:
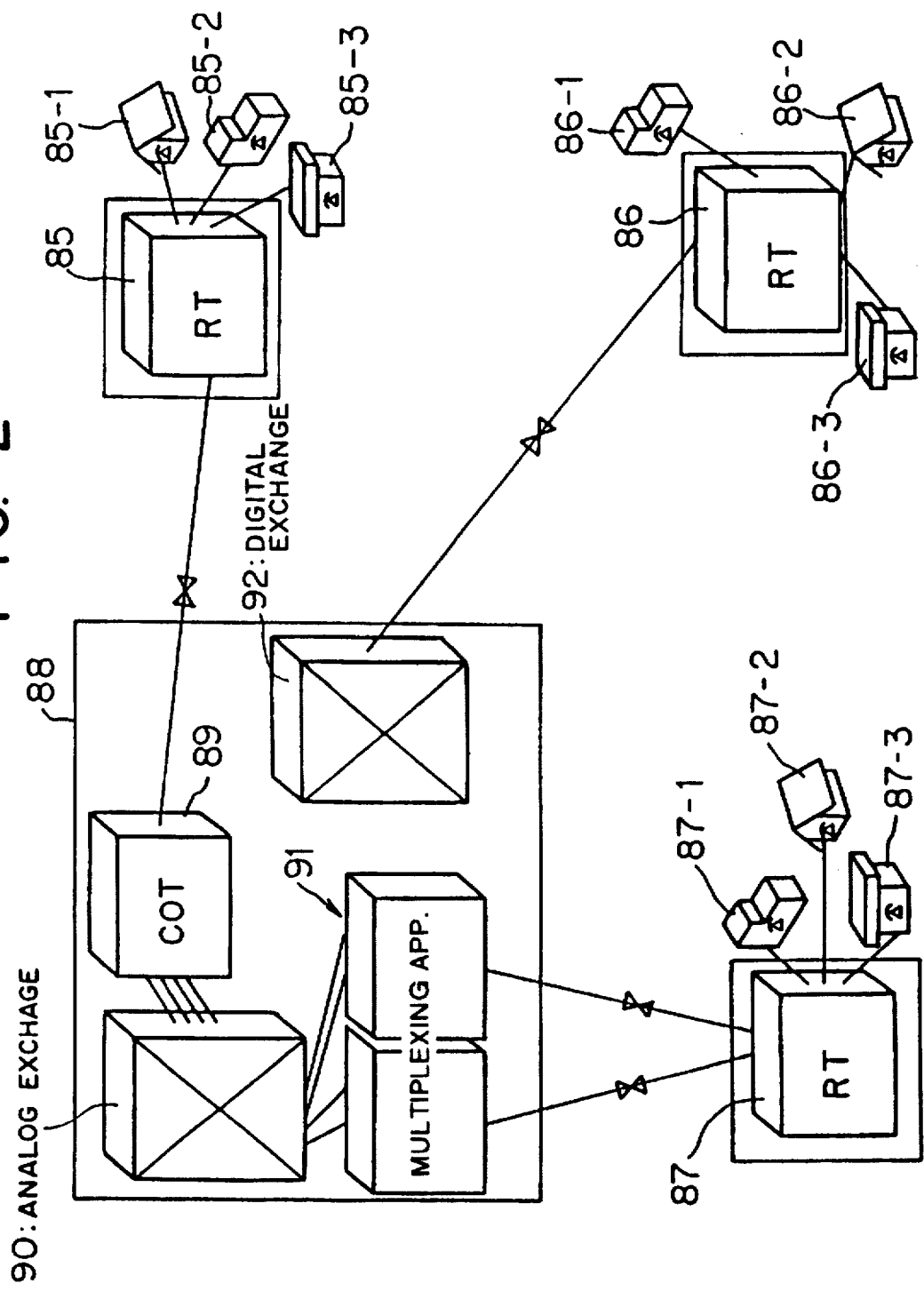
FIG. 2 is a diagram showing an example of a network to which a signal processing apparatus according to an embodiment of the present invention is applied.

FIG. 2 is a diagram showing an example of a network to which a signal processing apparatus according to the embodiment of the present invention is applied. In FIG. 2, numerals 85–87 denote terminals (RT) which are located at the side of subscribers 85-1 to 85-3, 86-1 to 86-3 and 87-1 to 87-3, respectively, (hereinafter referred to as "subscriber-side terminals") and which include channels corresponding to these subscribers. Numeral 88 denotes a central exchange office connected to the subscriber-side terminals 85–87.

As shown in FIG. 2, a central office terminal (COT) 89, an analog exchange 90, a multiplexing apparatus 91 and a digital exchange 92 are provided in the central exchange office 88. The connection between the central office terminal 89 and the subscriber-side terminal 85 and the connection between the digital exchange 92 and the subscriber-side terminal 86 are realized in the form of "Digital Loop Carrier". The multiplexing apparatus 91 and the subscriber-side terminal 87 are connected with each other in a predetermined manner.

The signal processing apparatus according to the embodiment of the present invention is applied to the subscriber-side terminals 85–87, and the center office terminal 89.

Figure 3:
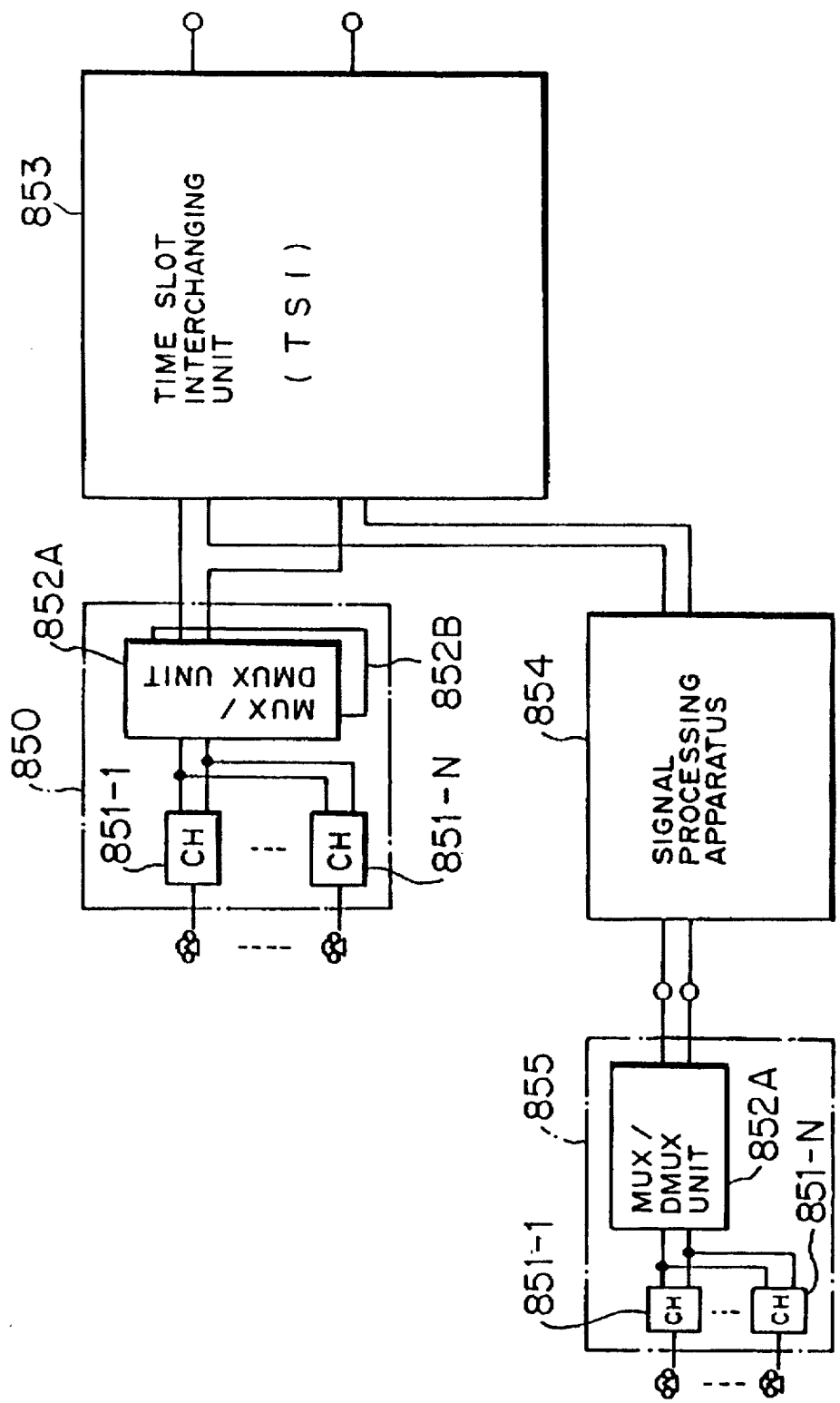
FIG. 3 is a block diagram showing the detailed structure of a terminal located at the side of subscribers.

FIG. 3 is a diagram showing the detailed structure of the subscriber-side terminal 85 (or 86, 87). As shown in FIG. 3, the subscriber-side terminal 85 (or 86, 87) basically includes signal processing apparatuses 850, 854 and 855, and a time slot interchanging unit (TSI) 853. For example, the signal processing apparatus 850, which is the main part of the present invention, has channel units 851-1 to 851-N including a plurality of channels, and multiplexing/demultiplexing units 852A and 852B for multiplexing and demultiplexing a plurality of sets of channel data exchanged among the channel units 851-1 to 851-N. In this embodiment, the multiplexing/demultiplexing unit 852A is presently used while the multiplexing/demultiplexing unit 852B is a spare.

The signal processing apparatus 855 also has channel units 851-1 to 851-N, and a multiplexing/demultiplexing unit 852A.

Although the signal processing apparatus 850, which is the main part of the present invention, will now be described in detail, it is to be noted that the signal processing apparatus 855 has a similar structure.

Figure 4:
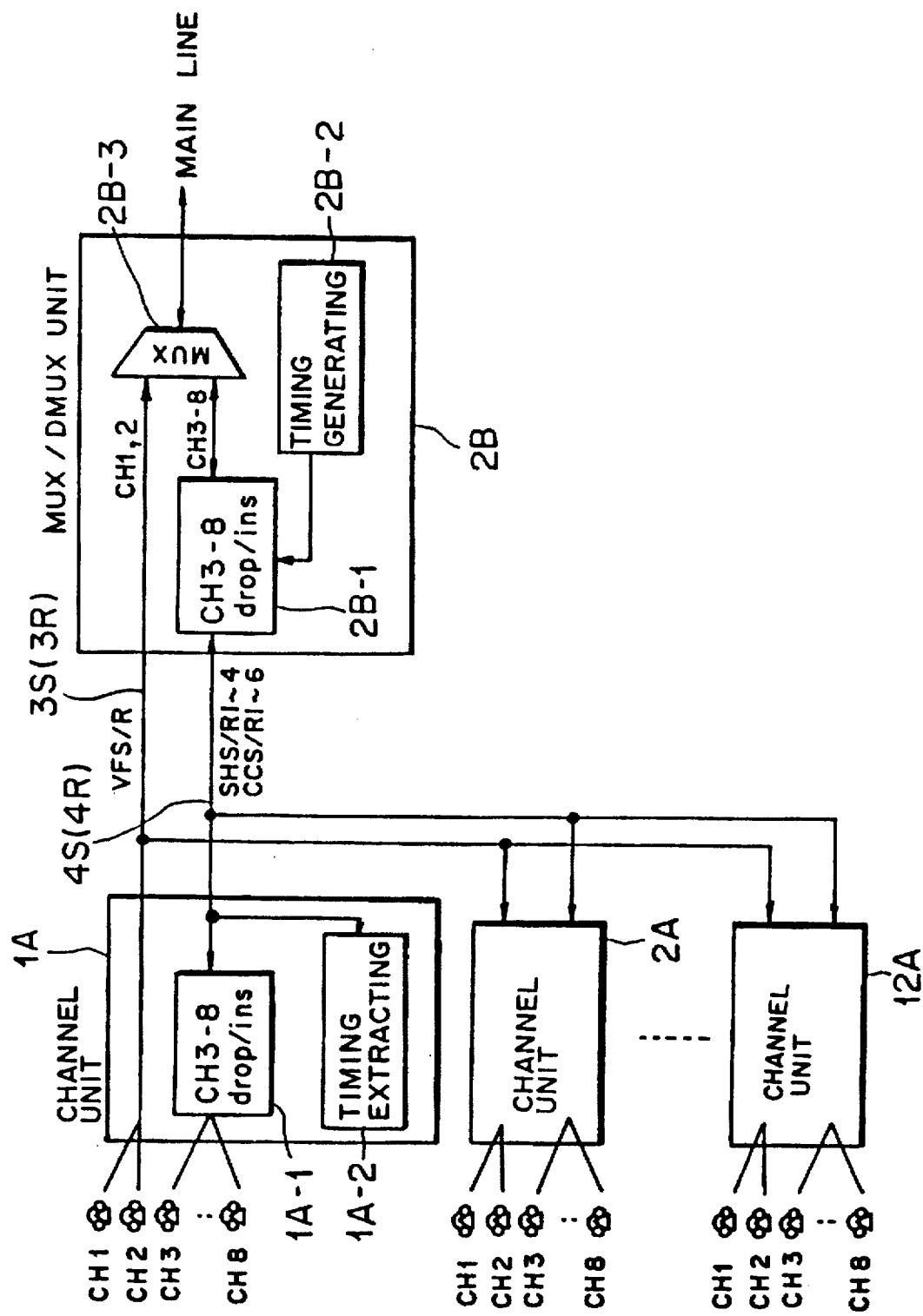
FIG. 4 is a block diagram showing the structure of the signal processing apparatus according to the embodiment of the present invention.

FIG. 4 is a block diagram showing the structure of the signal processing apparatus according to the present embodiment. As shown in FIG. 4, the signal processing apparatus is composed of a plurality of channel units 1A–12A each including 8 channels (CH1–CH8), a multiplexing/demultiplexing unit 2B for multiplexing (or separating) a plurality of sets of channel data exchanged among the channel units 1A–12A, a data signal line (VFS, VFR) 3S (3R) for transmitting channel data between the channel units 1A–12A and the multiplexing/demultiplexing unit 2B, and a timing signal line 4S (4R) for transmitting timing signals (timing pulses) from the multiplexing/ demultiplexing unit 2B to the channel units.

Each of the channel units 1A–12A includes a channel data extracting/inserting unit (CH3–CH8 drop/ins) 1A-1, and a timing extracting unit 1A-2. These units in other channel units 2A–12A are omitted from the drawing. The multiplexing/demultiplexing unit 2B includes a channel data extracting/inserting unit (CH3–CH8 drop/ins) 2B-1, a timing generating unit 2B-2, and a multiplexing/demultiplexing unit 2B-3.

In the signal processing apparatus shown in FIG. 4, channel data of the channels CH1 and CH2 are exchanged between the channel units 1A–12A and the multiplexing/ demultiplexing unit 2B through the data signal line 3S (3R), and channel data of the remaining channels CH3–CH8 are exchanged between the channel units 1A–12A and the multiplexing/demultiplexing unit 2B not through the data signal line 3S (3R) but through the timing signal line 4S (4R) by the operation of the channel data extracting/inserting units 1A-1 and 2B-1.

The timing generating unit 2B-2 generates timing pulses CCS(CCR)1–CCS(CCR)6 and SHS(SHR)1–SHS(SHR)4 which will be described later. The timing extracting unit 1A-2 extracts the timing indicated by the timing pulses CCS(CCR)1–CCS(CCR)6 and SHS(SHR)1–SHS(SHR)4 which are input through the timing signal line 4S (4R). The channel data extracting/inserting units 1A-1 and 2B-1 operate at the timing determined by the timing pulses CCS(CCR) 1–CCS(CCR)6 and SHS(SHR)1–SHS(SHR)4 to transfer the channel data of the channels CH3–CH8 through the timing signal line 4S (4R).

Figure 5:
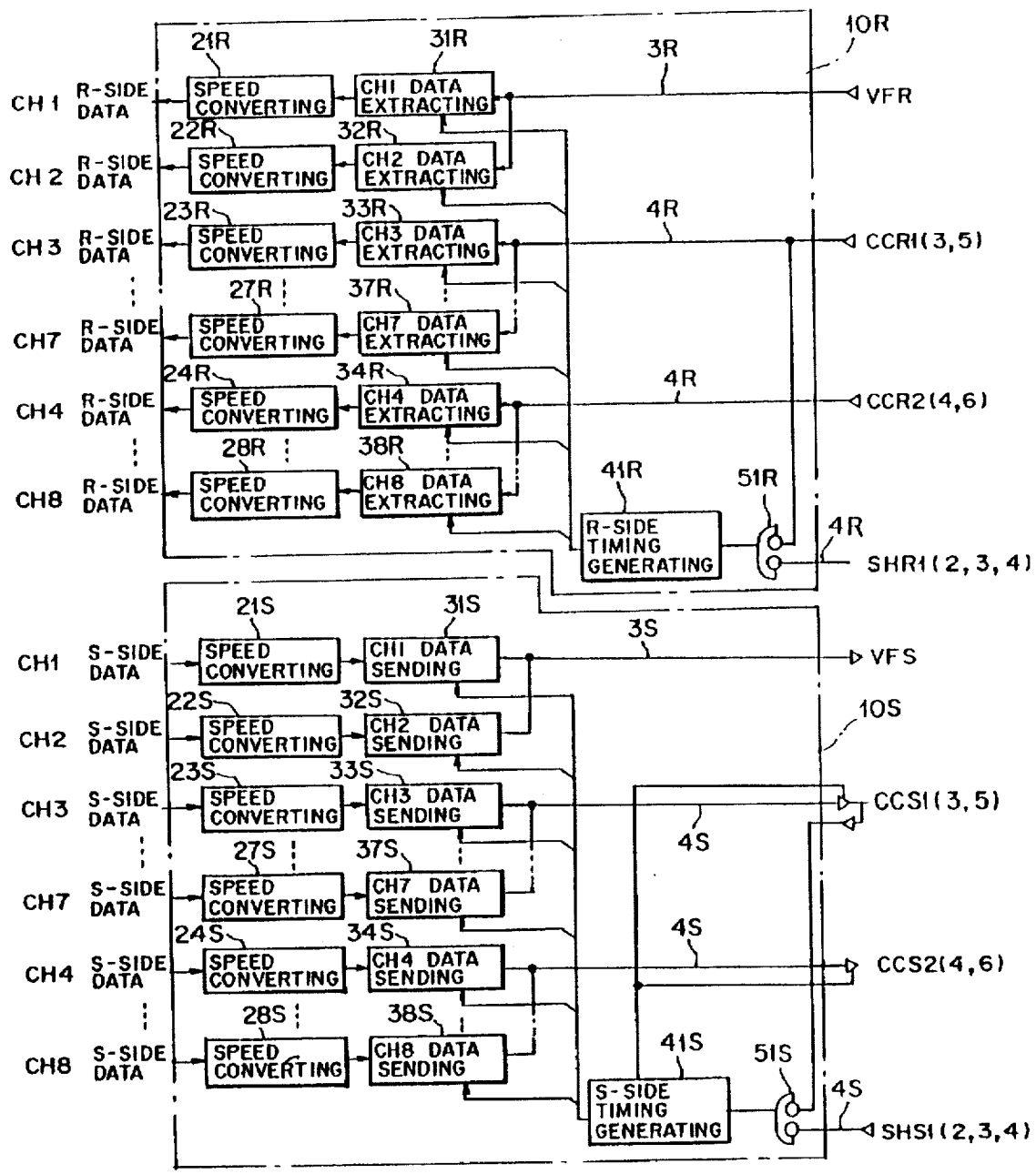
FIG. 5 is a block diagram showing the structure of a channel unit used in the signal processing apparatus of the embodiment.

For this purpose, as shown in FIG. 5, each of the channel units 1A–12A is composed of a receiving system (a channel data receiving processing unit) 10R and a sending system (a channel data sending processing unit) 10S. The receiving system 10R includes speed converting units 21R–28R, channel data extracting units 31R–38R, and a receiving-side (R-side) timing generating unit 41R. The sending system 10S includes speed converting units 21S–28S, channel data sending units (data sending units for CH1–CH8) 31S–38S, and a sending-side (R-side) timing generating unit 41S.

In the sending system 10S, the speed converting units 21S–28S perform desired speed conversion for sending-side (S-side) channel data from the channels CH1–CH8. The speed converting units 21S–28S are formed by buffer memories or the like.

The channel data sending units (data sending units for CH1–CH8) 31S–38S transmit the channel data from the channels CH1–CH8 to the multiplexing/demultiplexing unit 2B by using the timing pulses CCS1–CCS6 and the timing pulses SHS1–SHS4 input through the timing signal line 4S to determine the timing of the sending operation. The sending-side timing generating unit 41S generates sending timing pulses for the channel data sending units 31S–38S based on the timing pulses CCS1, CCS3 and CCS5 and the timing pulses SHS1–SHS4 which are input through the timing signal line 4S.

As shown in FIG. 5, channel data sending units 31S and 32S for two channels (CH1, CH2) among the eight channel data sending units 31S–38S are connected to the data signal line 3S, and channel data sending units 33S–38S for the remaining six channels (CH3–CH8) are connected to the timing signal line 4S. Accordingly, channel data from the two channel data sending units 31S and 32S are transmitted to the multiplexing/demultiplexing unit 2B through the data signal line 3S.

At this time, channel data from the remaining six channel data sending units 33S–38S are superposed on (inserted into) empty slots of the timing pulses CCS1–CCS6, and transmitted to the multiplexing/demultiplexing unit 2B through the timing signal line 4S. The empty slots mean periods of time which are between the points in time when the timing pluses SHS1–SHS4 become a "LOW" level and in which the timing pulses CCS1–CCS6 can take any level (pulse value).

Figure 6:
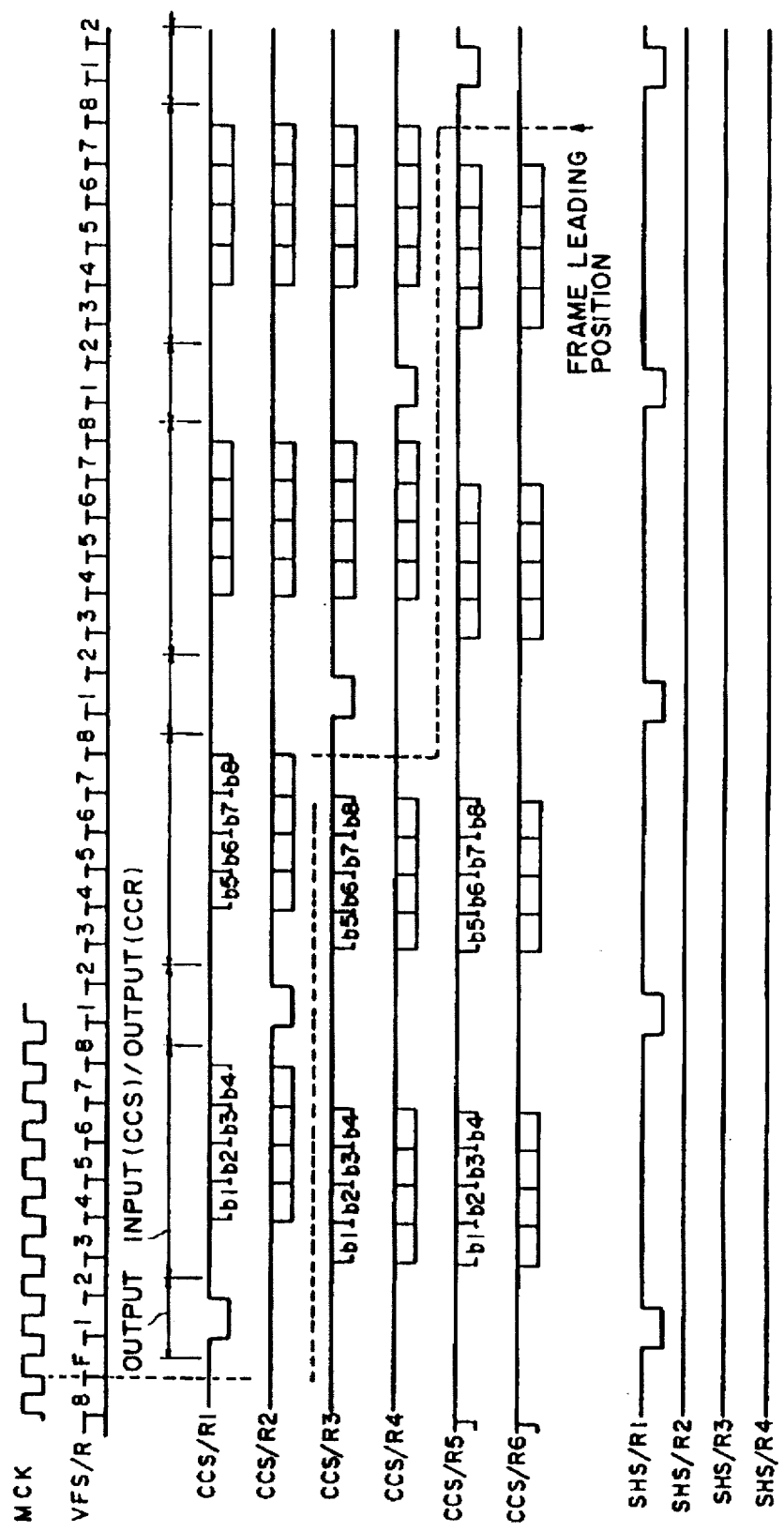
FIG. 6 is a chart for explaining an example of the operation for inserting channel data into timing pulses in the signal processing apparatus of the embodiment.

Specifically, in the channel unit 1A, for example, channel data from the channels "CH1" and "CH2" are transmitted from the channel data sending units 31S and 32S toward the multiplexing/demultiplexing unit 2B through the data signal line 3S in an ordinary manner. As shown in FIG. 6, channel data from the remaining channels "CH3–CH8", which have been added, are inserted into empty slots of the timing pulses CCS1 and CCS2, as 4-bit data (b1–b4, b5–b8), in the channel data sending units 33S–38S, and are transmitted to the multiplexing/demultiplexing unit 2B through the timing signal line 4S instead of the data signal line 3S.

Similarly, in other channel units 2A–12A, channel data from the channels "CH1" and "CH2" are transmitted toward the multiplexing/demultiplexing unit 2B through the data signal line 3S in an ordinary manner while channel data from the remaining channels "CH3–CH8" are inserted into empty slots of the timing pulses CCS1–CCS6 and are transmitted to the multiplexing/demultiplexing unit 2B through the timing signal line 4S.

At this time, channel data are inserted into empty slots of the timing pulses CCS1–CCS6 such that the frame leading positions of the channel data inserted into the timing pulses CCS3 and CCS4 and the timing pulses CCS5 and CCS6 are respectively shifted, by a predetermined amount corresponding to 16 bits at a time, from the frame leading position of the channel data inserted into the timing pulses CCS1 and CCS2. This will be described hereinafter.

Figure 7:
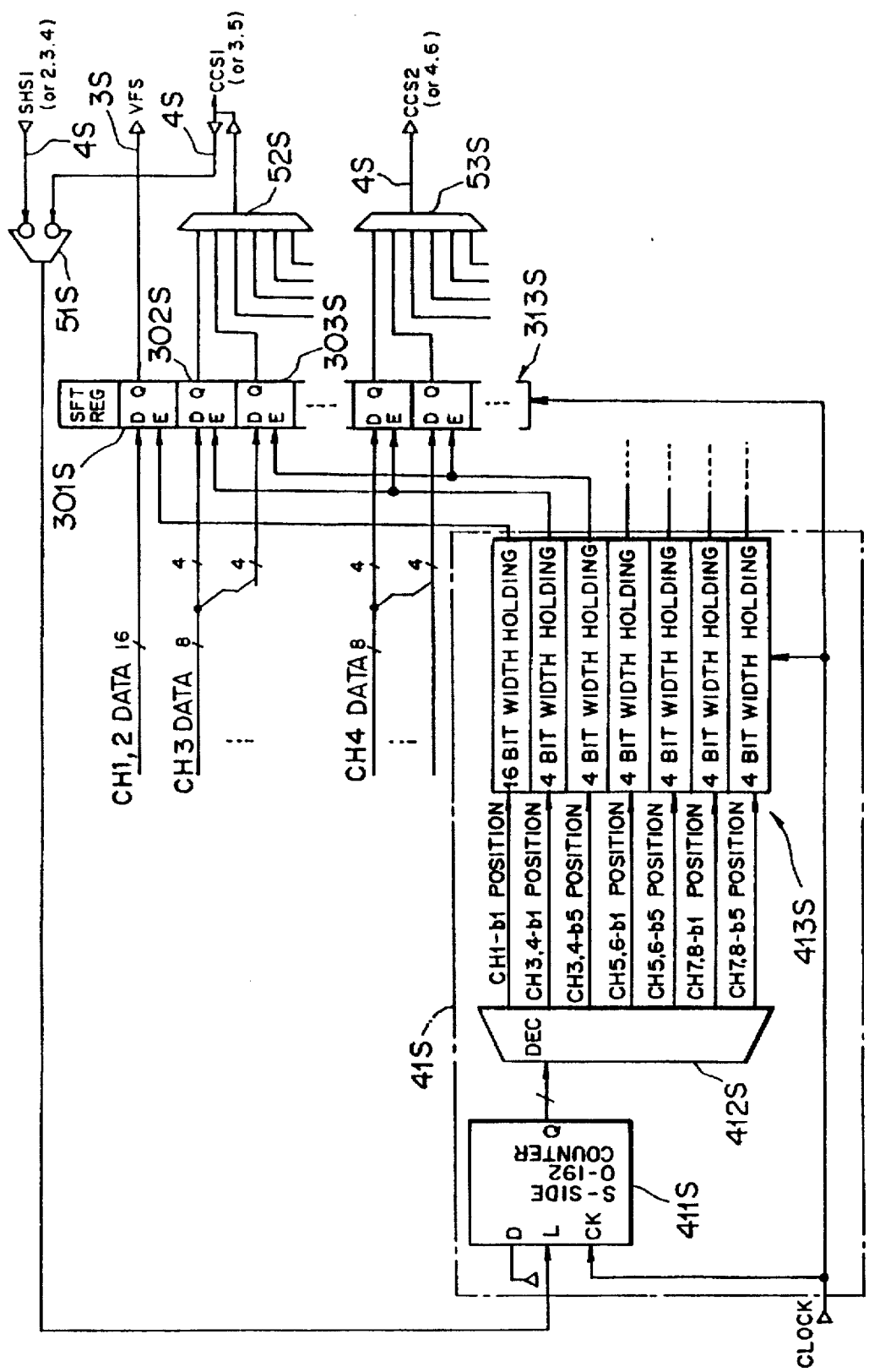
FIG. 7 is a block diagram showing the detailed structure of the channel unit (sending system) used in the embodiment.

For this purpose, as shown in FIG. 7, each of the channel data sending units 31S–38S in the above-described sending system 10S is composed of shift registers (SFT REG) 301S–313S while the sending-side timing generating unit 41S is composed of a 0–192 counter 411S, a decoder (DEC) 412S, and a bit holding unit 413S.

The sending-side timing signal generating unit 41S responds to a signal which is output from the AND gate 51S when both the timing pulse SHS1 (or SHS2, SHS3, SHS4) and the timing pulse CCS1 (or CCS3, CCS5), which are input through the timing signal line 4S, become a "Low" level and successively outputs count values of 0–192 to the decoder 412S.

The decoder 412S outputs signals each representing the channel data start position (the position of bit "b1" or "b5", see FIG. 6) of channel data from each of the channels (CH1–CH8). The bit holding unit 413S holds a bit width corresponding to 16 bits or 4 bits when the channel data start position is output from the decoder 412S, and outputs a signal corresponding to the bit width to the channel data sending units 31S–38S (the shift registers 301S–313S).

The shift register 301S superposes channel data of two channels (CH1, CH2), 8 bits at a time, on a signal which is held in the bit holding unit 413S and continues for a period corresponding to a bit width of 16 bits and outputs them through the data signal line 3S. Each of the shift registers 302S–313S superposes channel data input from each of the remaining channels (CH3–CH8), 4 bits at a time, on a signal which is held in the bit holding unit 413S and continues for a period corresponding to a bit width of 4 bits and outputs them. As a result, the channel data from the remaining 6 channels are inserted into empty slots of the timing pulses CCS1–CCS6, 4 bits (b1–b4 or b5–b8) at a time, as shown in FIG. 6.

More specifically, channel data from "CH3 (or CH5, CH7)" are inserted into empty slots of the timing pulse CCS1 (or CCS3, CCS5) by the shift registers 302S and 303S (or shift registers 304S and 305S, shift registers 306S and 307S), and channel data from "CH4 (or CH6, CH8)" are inserted into empty slots of the timing pulse CCS2 (or CCS4, CCS6) by the shift registers 308S and 309S (or shift registers 310S and 311S, shift registers 312S and 313S). These inserted data are transmitted to the multiplexing/demultiplexing unit 2B through the selectors 52S and 53S and the timing signal line 4S.

Figure 8:
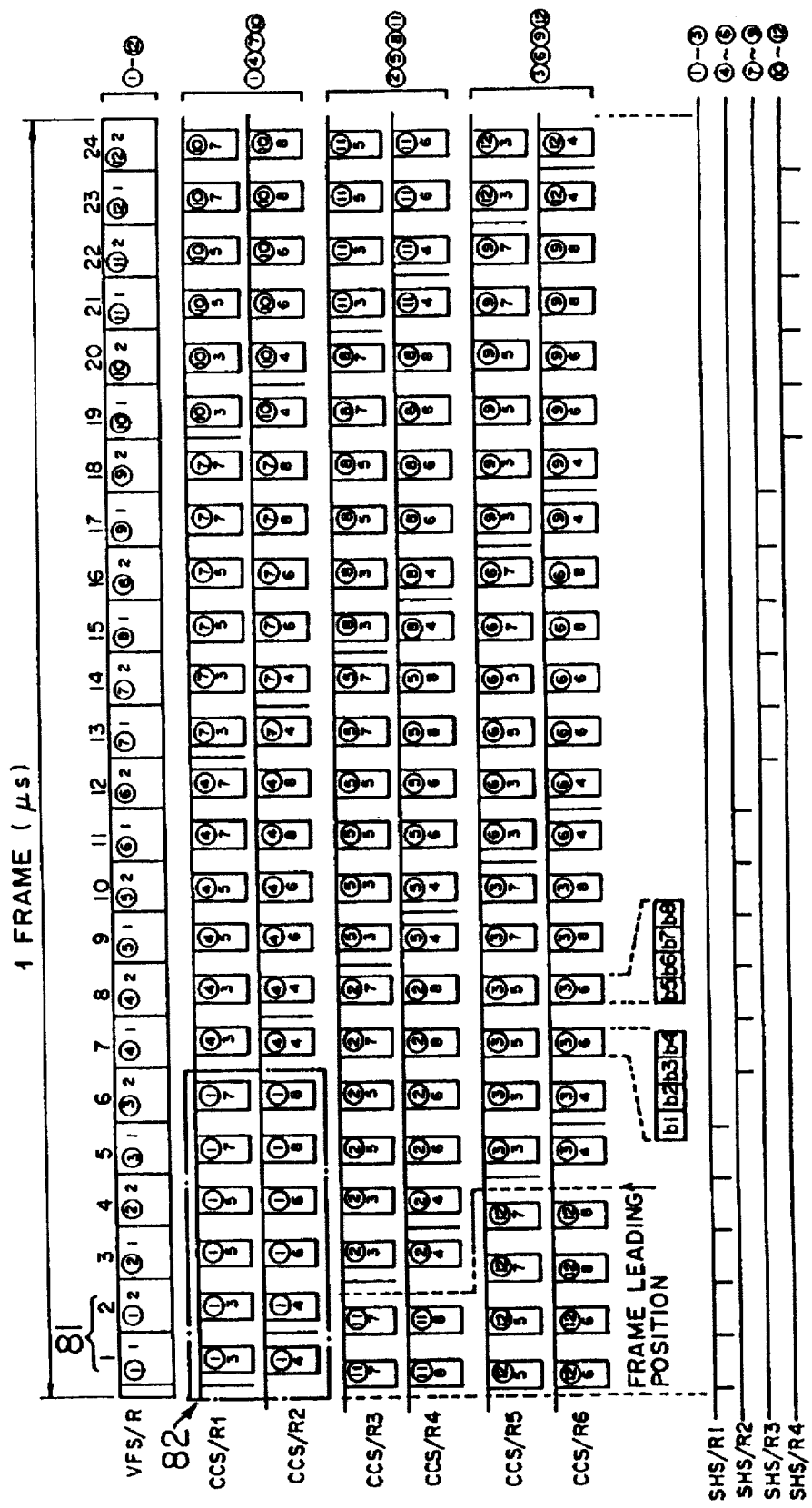
FIG. 8 is a chart for explaining an example of allocation of time slots in the signal processing apparatus of the embodiment.

FIG. 8 is a chart showing time slots of a single frame allocated to channel data which are transmitted from the channel units 1A–12A through the data signal line 3S (VFS) and the timing signal line 4S in the above-described manner. As is apparent from FIG. 8, data from the additional channels (CH3–CH8) in each of the channel units 1A–12A are inserted into empty slots of the timing pulses CCS1–CCS6. In FIG. 8, ①, ②, ③, etc., represent the unit numbers of the channel units 1A–12A while numerals "1" to "8" paired with the unit numbers ①, ②, ③, etc., represent channel numbers.

As shown in FIG. 8, channel data from CH1 and CH2 among the channels (CH1–CH8) of the channel unit 1A having a channel number ① are transmitted through the data signal line (VFS) 3S in an ordinary manner, as indicated by numeral 81, while channel data from the remaining CH3–CH8 are inserted into empty slots of the timing pulses CCS1 and CCS2 (slots indicated by numeral 82) and are transmitted.

Similarly, channel data from CH1 and CH2 of other channel units 2A–12A having channel number ②, ③, etc., are transmitted through the data signal line (VFS) 3S in an ordinary manner, while channel data from the remaining CH3–CH8 are inserted into empty slots of the timing pulses CCS1–CCS6 (slots indicated by numeral 82) and are transmitted.

At this time, the channel unit 1A–12A are divided into three groups, as shown in FIG. 8, i.e., the group including channel units 1A, 4A, 7A and 10A (unit numbers ①, ④, etc.), the group including channel units 2A, 5A, 8A and 11A (unit numbers ②, ⑤, etc.), and the group including channel units 3A, 6A, 9A and 12A (unit numbers ③, ⑥, etc.). As shown by the drawing of the timing pulses CCS(CCR)1 and CCS(CCR)2, the frame leading positions of a plurality of sets of channel data respectively handled by the channel units 1A, 4A, 7A and 10A (unit numbers ①, ④, etc.) are made coincide with each other, and the frame leading positions of a plurality of sets of channel data handled by other channel units forming a different group are shifted by a predetermined amount corresponding to 16 bits.

Accordingly, in the channel units 1A–12A, when the timing pulse CCS(CCR)1–CCS(CCR)6 and the timing pulse SHS(SHR)1–SHS(SHR)4 both become a "Low" level, this point in time can be detected as the frame leading position of channel data handled by each of the channel units 1A–12A. Hence, each of the channel units 1A–12A can considerably easily detect the position at which channel data to be handled by each channel unit is inserted.

Meanwhile, in the receiving system 10R of each of the channel units 1A–12A, the channel data extracting units 31R–38R extract channel data corresponding to channels (CH1–CH8) included in the channel unit. That is, channel data for these channels input through the data signal line 3R and the timing signal line 4R are extracted by using the timing pulses CCR1–CCR6 and SHR1–SHR4 to determine the timing of extraction.

The receiving-side timing generating unit 41R generates extracting timing signals for the channel data extracting units 31R–38R based on the above-described timing pluses CCR1, CCR3, CCR5 and the timing pulses SHR1–SHR4 which are input through the timing signal line 4R.

The speed converting units 21R–28R, which are formed by buffer memories or the like, perform speed conversion for the outputs of the channel data extracting units 31R–38R.

Figure 9:
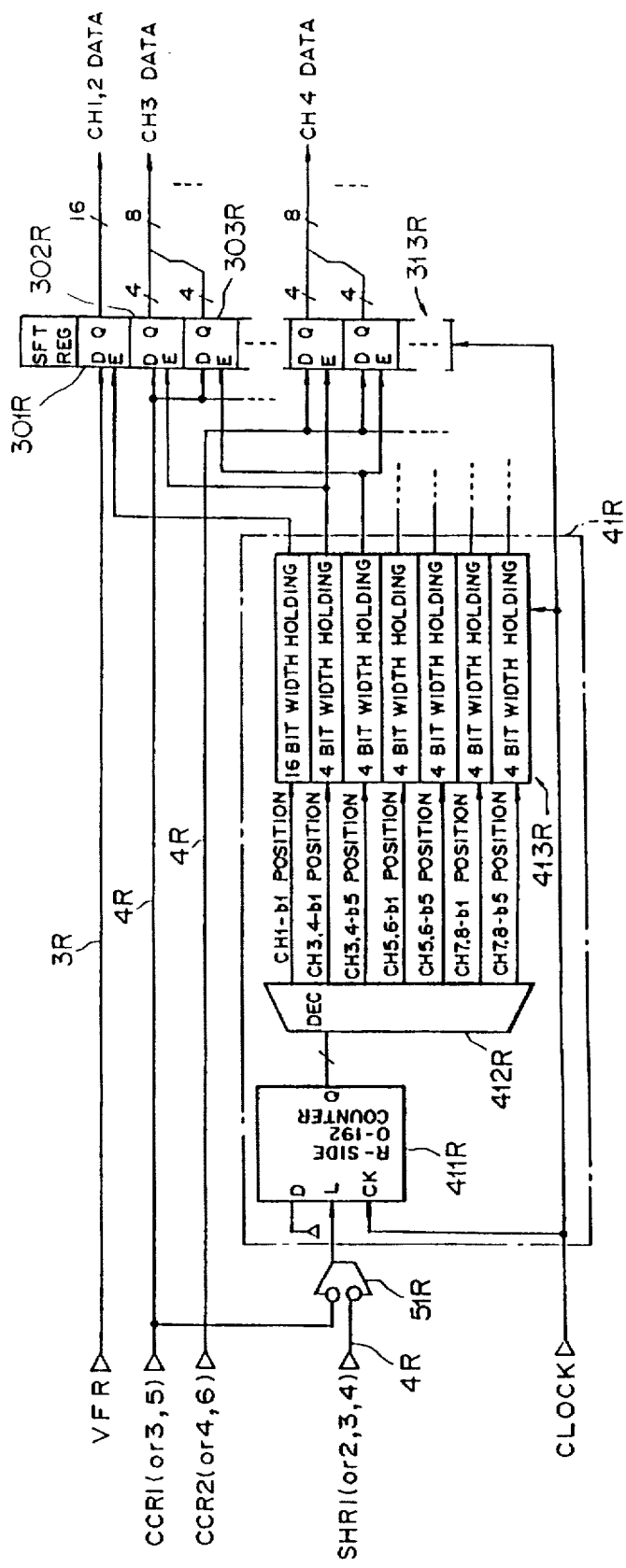
FIG. 9 is a block diagram showing the detailed structure of the channel unit (receiving system) used in the embodiment.

As shown in FIG. 9, each of the channel data extracting units 301R–313R of the receiving system 10R is composed of a shift register (SFT REG) to provide a structure corresponding to that in the sending system 10S. The receiving-side timing generating unit 41R is composed of a 0–192 counter 411R, and a decoder (DEC) 412R. The AND gate 51R is the same as the AND gate 51R which has already been described with reference to FIG. 5.

The counter 411R responds to a signal which is output from the AND gate 51R when both the timing pulse SHR1 (or SHR2–SHR4) and the timing pulse CCR1 (or CCR3, CCR5), which are input through the timing signal line 4R, become a "Low" level and successively outputs count values of 0–192 to the decoder 412R.

The decoder 412R selectively outputs signals each representing a signal from which channel data are to be extracted, in accordance with the output of the counter 411R, so as to generate extracting timing signals for the shift registers (channel data extracting units) 301R–313R.

When channel data are extracted from the signal input through the data signal line 3R, the decoder 412R generates an extracting timing signal for extracting channel data of 16 bits, 8 bits at a time. When channel data are extracted from the timing pulse CCR1 (or CCR3, CCR5) input through the timing signal line 4R, the decoder 412R generates another extracting timing signal for extracting 4-bit data which have been inserted into the timing pulse from the data starting positions "b1" and "b5", respectively. These extracting timing signals thus generated are output to the shift registers 301R–313R.

The shift register 301R extracts channel data from the signal input through the data signal line 3R in response to an extracting timing signal from the decoder 412R. In this case, data of 16 bits are extracted, 8 bits at a time, from the signal on the data signal line 3R in response to the extracting timing signal from the decoder 412R so that channel data for "CH1" and "CH2" are extracted.

The remaining twelve shift registers 302R–313R extract 4-bit data for "CH3–CH8" from the empty slots of the timing pulses CCR1–CCR6, which are input though the timing signal line 4R, in response to other extracting timing signals from the decoder 412R.

More specifically, channel data for "CH3 (or CH5, CH7)" are extracted from the empty slots of the timing pulse CCR1 (or CCR3, CCR5) by the shift registers 302R and 303R (or shift registers 304R and 305R, shift registers 306R and 307R) in response to an extracting timing signal from the decoder 412R, and channel data for "CH4 (or CH6, CH8)" are extracted from the empty slots of the timing pulse CCR2 (or CCR4, CCR6) by the shift registers 308R and 309R (or shift registers 310R and 311R, shift registers 312R and 313R) in response to another extracting timing signal from the decoder 412R.

Figure 10:
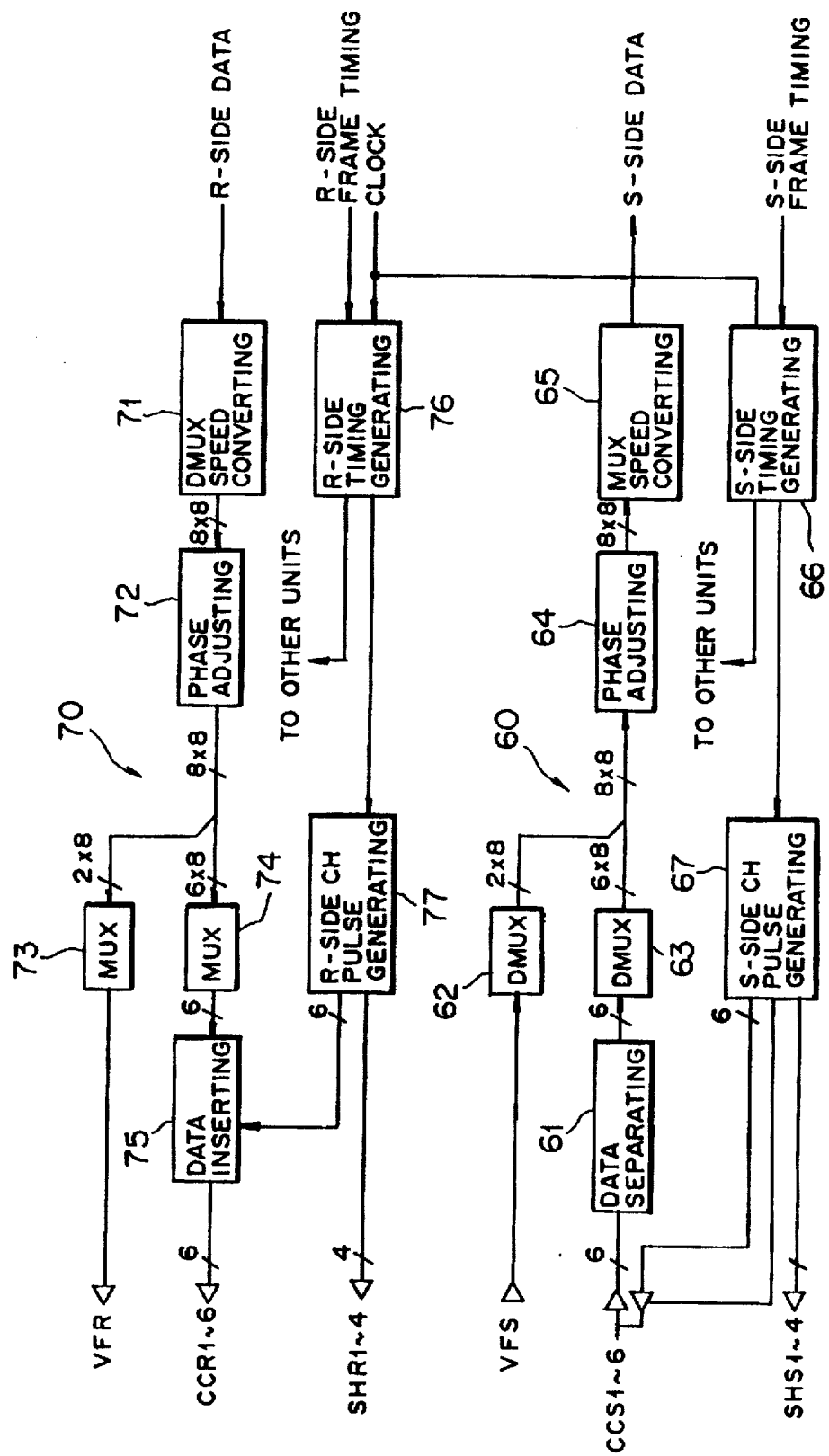
FIG. 10 is a block diagram showing the structure of the multiplexing/demultiplexing unit used in the signal processing apparatus of the embodiment.

As shown in FIG. 10, the multiplexing/demultiplexing unit 2B includes a sending system (channel data receiving processing unit) 60 which receives channel data from the channel units 1A–12A through the data signal line 3S, and performs a predetermined processing on the received channel data to transmit them to the counterpart of the communication, and a receiving system (channel data sending processing unit) 70 which receives channel data from the counterpart of the communication, and performs a predetermined processing on the channel data to transmit them to the channels "CH1–CH8" through the data signal line 3R.

As shown in FIG. 10, the sending system 60 includes a data separating unit 61, demultiplexing units (DMUXs) 62 and 63, a phase adjusting unit 64, a multiplexing and speed converting unit (MUX) 65, a sending-side timing generating unit 66, and a sending-side channel pulse generating unit 67. The receiving system 70 includes a demultiplexing and speed converting unit (DMUX) 71, a phase adjusting unit 72, multiplexing units (MUXs) 73 and 74, a data inserting unit 75, a receiving-side timing generating unit 76 and a receiving-side channel pulse generating unit 77, thereby providing a structure corresponding to the structure of the sending system 60.

Figure 11:
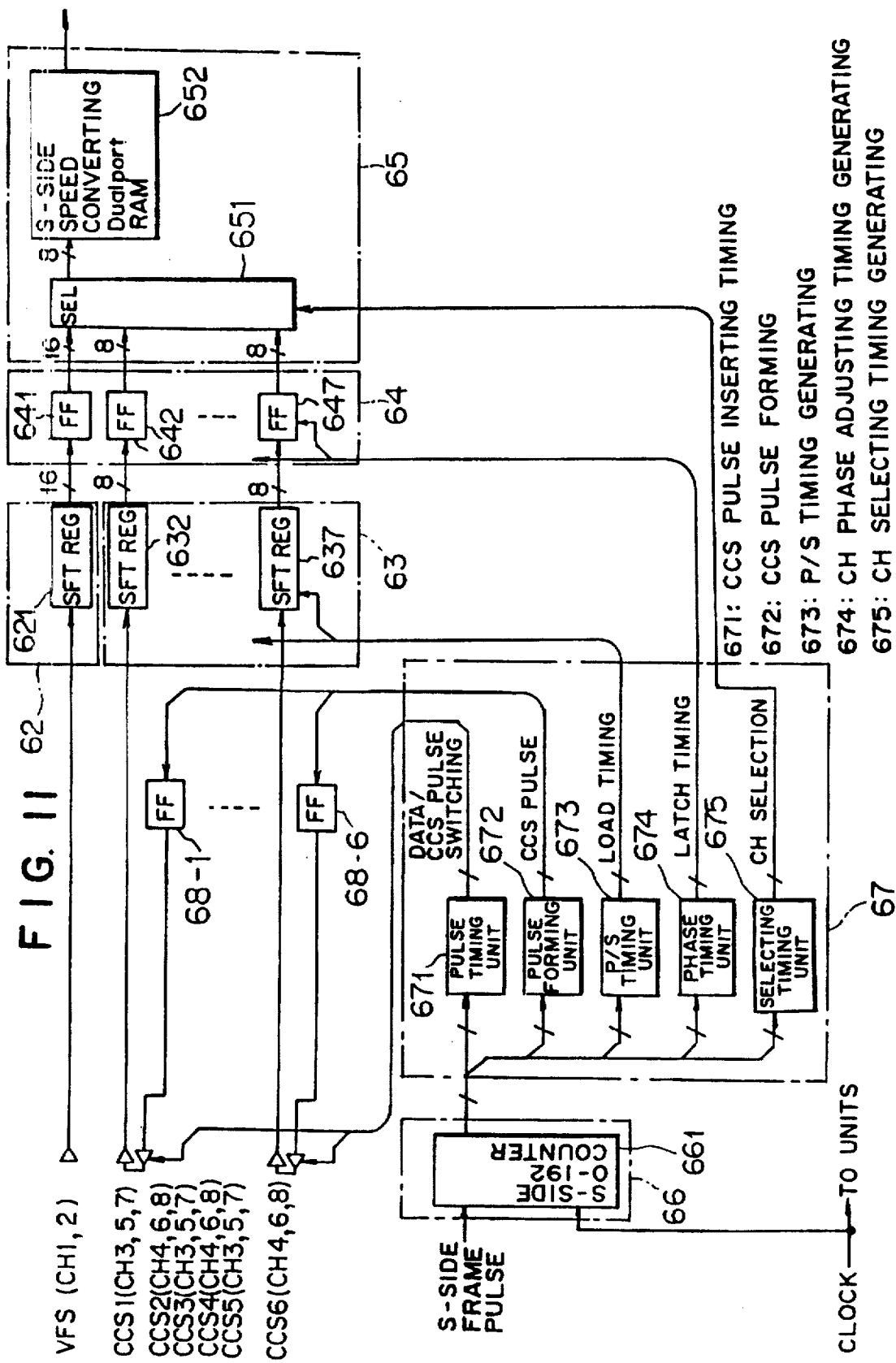
FIG. 11 is a block diagram showing the detailed structure of the multiplexing/demultiplexing unit (sending system) used in the signal processing apparatus of the embodiment.

The data separating unit (channel data separating unit) 61 of the sending system 60 separates the channel data, which have been inserted into the empty slots of the timing pulses CCS1–CCS6 in the channel units 1A–12A (see FIG. 8), from the timing pulses CCS1–CCS6 input through the timing signal line 4S. The DMUX 62 demultiplexes the channel data of two channels (CH1, CH2) input through the data signal line 3S to separate them into two sets of data for CH1 and CH2. As shown in FIG. 11, the DMUX 62 is composed of a shift register 621. The DMUX 63 demultiplexes the channel data of six channels (CH3–CH8) separated from the timing pulses CCS1–CCS6 by the data separating unit 61 to obtain six sets of data for these channels. As shown in FIG. 11, the DMUX 63 is composed of shift registers 632–637.

The phase adjusting unit 64 adjusts the phases of channel data for 8 channels output from the DMUXs 62 and 63 to synchronize their phases. As shown in FIG. 11, the phase adjusting unit 64 is composed of flip flop circuits (FF) 641–647. The multiplexing and speed converting unit 65 performs time-division multiplexing for the channel data synchronized by the phase adjusting unit 64 so as to output data to be transmitted through a single line. As shown in FIG. 11, the multiplexing and speed converting unit 65 is composed of a selector (SEL) 651 which selectively outputs the plurality of sets of channel data in accordance with selection signals output from the sending-side channel pulse generating unit 67 so as to multiplex the channel data by time-division multiplexing, and a speed converting unit (a dual-port RAM) 652 for performing seed conversion for the output of the selector 651.

The sending-side timing generating unit 66 generates a timing signal for detecting the timing when channel data for "CH1" and "CH2" from each of the channel units 1A–12A starts in each frame of channel data. As shown in FIG. 11, the timing generating unit 66 is composed of a 0–192 counter 661 which outputs values of 0–192 in response to input clocks.

The sending-side channel pulse generating unit 67 generates, according to the timing of the signals output from the sending-side timing generating unit 66, four kinds of timing pulses SHS1–SHS4 which become a "Low" level every 8 bits, and six kinds of timing pulses CCS1–CCS6 which become a "Low" level every 48 bits.

Based on the combinations between the four kinds of timing pulses SHS1–SHS4 and the six kinds of timing pulses CCS1–CCS6 (i.e., the combinations in which the two signals both become a "Low" level), the start positions of 24 kinds of channel data corresponding to "CH1" and "CH2" of the channels units 1A–12A within each frame of channel data can be detected.

For this purpose, the sending-side channel pulse generating unit 67 is composed of a CCS pulse inserting timing generating unit 671, a CCS pulse forming unit 672, a P/S timing generating unit 673, a channel phase adjusting timing generating unit 674, and a channel selecting timing generating unit 675, as shown in FIG. 11.

The CCS pulse inserting timing generating unit 671 output a signal to the DMUX 62 and the DMUX 63 in accordance with the timing of the timing pulses CCS1–CCS6 produced by the CCS pulse forming unit 672 so as to separate the channel data of CH3–CH8, which have been inserted into empty slots of the timing pulses CCS1–CCS6 in the channel units 1A–12A, from the timing pulses CCS1–CCS6.

The P/S timing generating unit 673 generates a load timing signal used for controlling the timing of loading channel data into the shift registers 621 and 632–637 of the DMUX 62 and the DMUX 63. The channel phase adjusting timing generating unit 674 generates a latch timing signal used for controlling the timing of latching the channel data in the flip flop circuits 641–647 of the phase adjusting unit 64. The channel selecting timing signal generating unit 675 generates a selection signal for selecting channel data output from the selector 651 of the multiplexing and speed converting unit 65.

Figure 12:
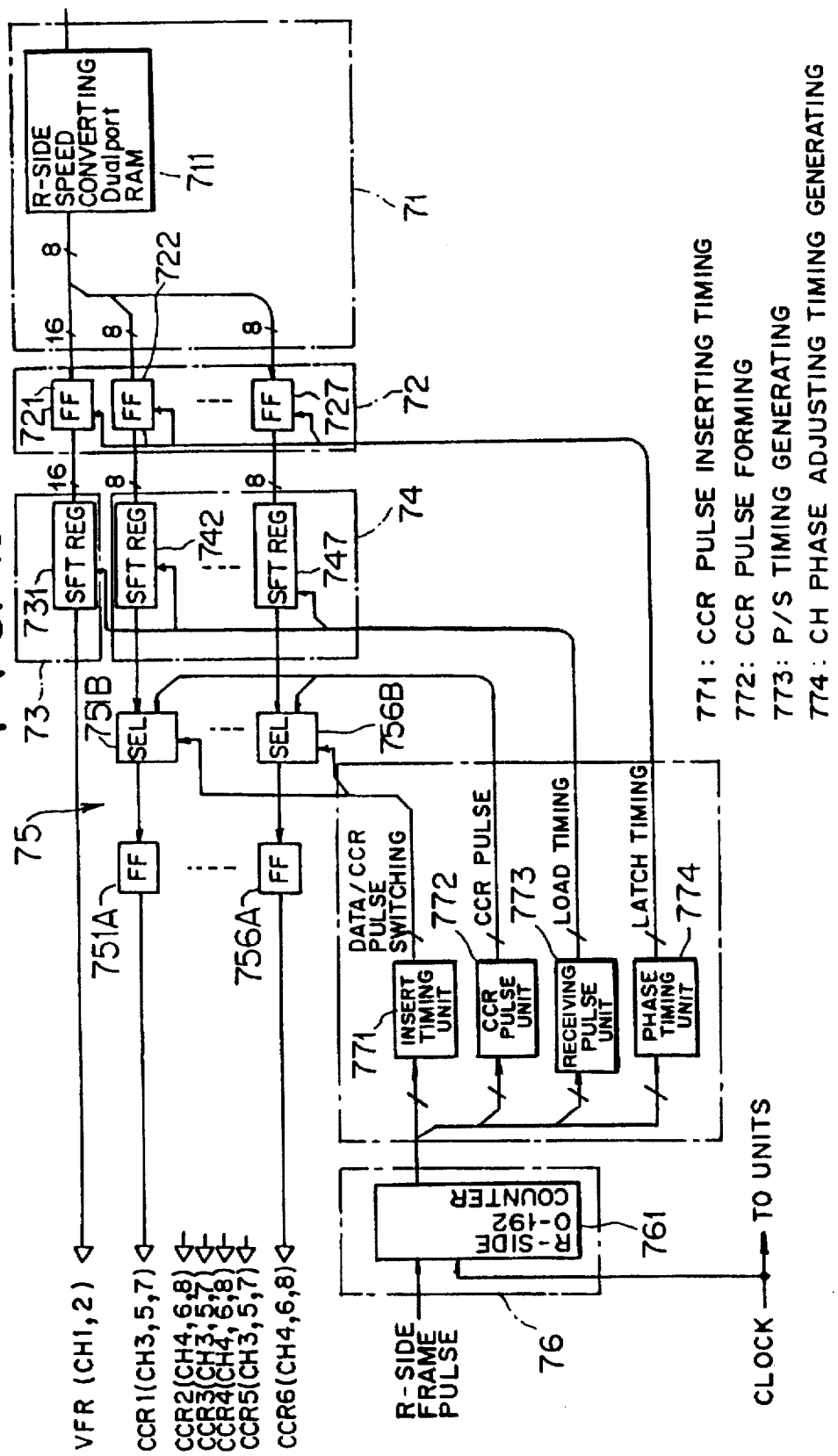
FIG. 12 is a block diagram showing the detailed structure of the multiplexing/demultiplexing unit (receiving system) used in the signal processing apparatus of the embodiment.

Meanwhile, in the receiving system 70, the demultiplexing and speed converting unit (channel data demultiplexing unit) 71 separates received channel data for 8 channels through the data signal line 3R to obtain a plurality of sets of channel data for the channels CH1–CH8 of each of the channel units 1A–12A, and converts the transmission speed of the plurality of sets of data. As shown in FIG. 12, the demultiplexing and speed converting unit 71 is composed of a speed converting unit (a dual-port RAM) 711.

The phase adjusting unit 72 adjusts the phases of channel data for 8 channels output from the demultiplexing and speed converting unit 71 to synchronize their phases. As shown in FIG. 12, the phase adjusting unit 72 is composed of FFs 721–727.

The MUX 73 multiplexes channel data for two channels (CH1, CH2) among channel data output from the phase adjusting unit 72 to convert them to data for a single line and transmits the data to the channel units 1A–12A through the data signal line 3R, so that part of the channel data separated by the demultiplexing and speed converting unit 71 are transmitted through the data signal line 3R. As shown in FIG. 12, the MUX 73 is composed of a shift register 731.

The MUX 74 multiplexes, by time-division multiplexing, channel data for the remaining six channels (CH3–CH8) among channel data output from the phase adjusting unit 72. As shown in FIG. 12, the MUX 74 is composed of shift registers 742–747. The data inserting unit (channel data inserting unit) 75 inserts the channel data for the remaining six channels (CH3–CH8), other than "CH1" and "CH2", output from the MUX 74 into empty slots of the timing pulses CCR1–CCR6 and transmits the data for the six channels in a manner as previously described in relation to FIG. 6 and FIG. 8.

For this purpose, the data inserting unit 75 is composed of flip flop circuits (FFs) 751A–756A, and selectors 751B–756B, as shown in FIG. 12.

The selectors 751B–756B superpose the channel data for the six channels (CH3–CH8) on the timing pulses CCR1–CCR6 generated by a receiving-side channel pulse generating unit 77, which will be described later, in response to a data/CCR pulse switching signal output from the receiving-side channel pulse generating unit 77, thereby inserting the channel data for the six channels (CH3–CH8) into empty slots of the timing pulses CCR1–CCR6. The flip flop circuits 751A–756A latch the outputs of the selectors 751B–756B.

Similar to the sending-side timing generating unit 66 of the sending system 60, the receiving-side timing generating unit 76 generates a timing signal for detecting the timing when channel data for "CH1" and "CH2" of each of the channel units 1A–12A starts in each frame of channel data. As shown in FIG. 12, the timing generating unit 76 is composed of a 0–192 counter 761 which is similar to that used in the sending system 60.

Similar to the sending-side channel pulse generating unit 67 of the sending system 60, The receiving-side channel pulse generating unit 77 generates, according to the timing of the signals output from the receiving-side timing generating unit 76, four kinds of timing pulses SHR1–SHR4 which become a "Low" level every 8 bits, and six kinds of timing pulses CCR1–CCR6 which become a "Low" level every 48 bits.

In this receiving system 70, the start positions of 24 kinds of channel data corresponding to "CH1" and "CH2" of the channels units 1A–12A within a frame of channel data input through the data signal line 3R can be detected based on the combinations between the four kinds of timing pulses SHR1–SHR4 and the six kinds of timing pulses CCR1–CCR6 (i.e., the combinations in which the two signals both become a "Low" level).

For this purpose, the receiving-side channel pulse generating unit 77 is composed of a CCR pulse inserting timing generating unit 771, a CCR pulse forming unit 772, a P/S timing generating unit 773, and a channel phase adjusting timing generating unit 774, as shown in FIG. 12.

The CCR pulse inserting timing generating unit 771 outputs, in accordance with the output of the counter 761, a data/CCR pulse switching signal used for controlling the timing of superposing the channel data for the six channels CH3–CH8 on the timing pulses CCR1–CCR6 which have been produced by the CCR pulse forming unit 772 which will be described later. The data/CCR pulse switching signal is input to the selectors 751B–756B of the data inserting unit 75. The CCR pulse forming unit 772 produces the timing pulses CCR1–CCR6 for the selectors 751B–756B.

Similar to the P/S timing generating unit 673 of the sending-side (see FIG. 11), the P/S timing generating unit 773 generates a load timing signal used for controlling the timing of loading channel data into the shift registers 721 and 742-747 of the MUX 73 and the MUX 74 in accordance with the output of the counter 761. The channel phase adjusting timing generating unit 774 generates a latch timing signal used for controlling the timing of latching the channel data in the flip flop circuits 721-727 of the phase adjusting unit 72, in a manner similar to that of the channel phase adjusting timing generating unit 674 of the sending-side (see FIG. 11).

In the signal processing apparatus according to the present embodiment having the above-described structure, when data are transmitted from channels CH1-CH8 included in each of the channel units 1A-12A, these channel data are subjected to suitable speed conversion by the speed converting units 21S-28S in the sending system 10S of each of the channel units 1A-12A and transmitted to the channel data sending units 31S-38S.

In the channel data sending units 31S-38S, the channel data from the channels (CH1-CH8) are transmitted toward the multiplexing/demultiplexing unit 2B while using the timing pulses CCS1-CCS6 and the timing pulses SHS1-SHS4 input through the timing signal line 4S to determine the timing of transmitting the data. At this time, channel data for two channels (CH1, CH2) output from the channel data output units 31S and 32S are sent to the multiplexing/demultiplexing unit 2B through the data signal line 3S, and channel data for the remaining six channels (CH3-CH8) output from the channel data sending units 33S-38S are superposed on (inserted into) empty slots of the timing pulses CCS1-CCS6. During the periods corresponding to the empty slots located between the points in time when the timing pulses SHS1-SHS4 become a "LOW" level, the timing pulses CCS1-CCS6 can take any level (pulse value). Thus superposed data are sent to the multiplexing/demultiplexing unit 2B through the timing signal line 4S.

More specifically, when the timing pulse SHS1 (or SHS2, SHS3, SHS4) and the timing pulse CCS1 (or CCS3, CCS5) both become a "Low" level, the AND gate 51S shown in FIG. 7 outputs a signal so that the counter 411S successively outputs count values of 0-192 to the decoder 412S.

Subsequently, the decoder 412S outputs, in accordance with the output of the counter 411S, signals each representing the start position (the position of bit "b1" or "b5", see FIG. 6 and FIG. 8) of channel data output from each of the channels (CH1-CH8) to the bit holding unit 413S, in which a bit width corresponding to 16 bits or 4 bits and starting from the channel data start position is held and output to the shift registers 31S-38S.

After that, the shift register 301S outputs the channel data for two channels (CH1, CH2), 8 bits at a time, through the data signal line 3S, and the shift registers 302S-313S insert the channel data for the remaining six channels (CH3-CH8), 4 bits at a time, into empty slots of the timing pulses CCS1-CCS6, as shown in FIG. 6 and FIG. 8.

Specifically, two shift registers 302S and 303S (shift registers 304S and 305S, shift registers 306S and 307S) insert the channel data for "CH3 (CH5, CH7)" into empty slots of the timing pulse CCS1 (or CCS3, CCS5), and the shift registers 308S and 309S (or shift registers 310S and 311S, shift registers 312S and 313S) insert the channel data for "CH4 (CH6, CH8)" into empty slots of the timing pulse CCS2 (or CCS4, CCS6). These inserted channel data are selectively transmitted by the selectors 52S and 53S to the multiplexing/demultiplexing unit 2B through the timing signal line 4S.

For example, in the channel unit 1A, channel data from the channels "CH1" and "CH2" are transmitted from the channel data sending units 31S and 32S to the multiplexing/demultiplexing unit 2B through the data signal line 3S while channel data from the remaining channels "CH3-CH8" are inserted into empty slots of the timing pulses CCS1 and CCS2, as 4-bit data (b1-b4, b5-b8), in the channel data sending units 33S-38S and are transmitted to the multiplexing/demultiplexing unit 2B through the timing signal line 4S instead of the data signal line 3S.

Similarly, in other channel units 2A-12A, channel data from the remaining channels CH3-CH8 are inserted into empty slots of the timing pulses CCS1-CCS6 and are transmitted to the multiplexing/demultiplexing unit 2B through the timing signal line 4S.

The channel data of CH1 and CH2 output through the data signal line 3S and the channel data of CH3-CH8 output through the timing signal line 4S are input to the sending system 60 (see FIG. 10) of the multiplexing/demultiplexing unit 2B. In the multiplexing/demultiplexing unit 2B, the data separating unit 61 separates the channel data of the six channels (CH3-CH8) (see FIG. 6 or FIG. 8) from the empty slots of the timing pulses CCS1-CCS6 which are input through the timing signal line 4S.

More specifically, the sending-side timing generating unit 66 shown in FIG. 11 generates a timing signal which indicates the timing when the channel data of "CH1 and CH2" in each of the channel units 1A-12A starts within a frame of channel data. For examples, count values of 0-192 are output to the sending-side channel pulse generating unit 67 in response to input clocks.

In the sending-side channel pulse generating unit 67, the CCS pulse inserting timing generating unit 671 outputs a data/CCS pulse switching signal in accordance with the count value, so that the channel data of CH3-CH8, which have been inserted into the empty slots of the timing pulses CCS1-CCS6, are separated from the timing pulses CCS1-CCS6 using the data/CCS pulse switching signal.

The DMUX 63 separates the channel data of the six channels (CH3-CH8) separated from the timing pulses CCS1-CCS6 to separate them into data for each channel. Also, the DMUX 63 separates the channel data input through the data signal line 3S to separate the data into two sets of data for two channels (CH1, CH2). At this time, in the DMUX 62 and the DMUX 63 shown in FIG. 11, the timing of loading the channel data into the shift registers 641A-647A is controlled by the load timing signal from the P/S timing generating unit 673. After the channel data from the DMUXs 62 and 63 are subjected to frame synchronization in the phase adjusting unit 64, the channel data are subjected to multiplexing and speed conversion in the multiplexing and speed converting unit 65 and are output to the counterpart of the communication.

At this time, in the phase adjusting unit 64 shown in FIG. 11, the timing of latching the channel data in the flip flop circuits 641-647 is controlled by the channel phase adjusting timing generating unit 674. With this control, frame synchronization is performed. In the multiplexing and speed converting unit 65, the output of channel data from the selector 651 is controlled by the selection signal from the channel selecting timing signal generating unit 675 to multiplex the channel data. After that, the speed conversion of the multiplexed channel data is performed in the speed converting unit 652.

Next, a description will be give of the process for the case where channel data are transmitted from the multiplexing/demultiplexing unit 2B to the channel units 1A-12A, contrary to the above-described case.

When channel data which have been multiplexed in a multiplexing/demultiplexing unit (not shown) at the side of the counterpart of the communication are input to the receiving system 70 of the multiplexing/demultiplexing unit 2B shown in FIG. 10, the channel data are subjected to conversion of transmission speed in the speed converting unit 711 of the demultiplexing and speed converting unit 71. After that, the channel data are separated into a plurality of sets of channel data for eight channels (CH1–CH8) of the channel units 1A–12A, which are then subjected to phase synchronization by the phase adjusting unit 72.

At this time, in the phase adjusting unit 72, the timing of latching the channel data in the flip flop circuits 721–727 is controlled by the signal output from the channel phase adjusting timing generating unit 774 of the receiving-side channel pulse generating unit 77: With this control, the phases of the plurality of sets of channel data are synchronized.

Among the plurality of sets of channel data undergone the phase synchronization, channel data of two channels (CH1, CH2) are input to the MUX 73 while channel data of the remaining six channels (CH3–CH8) are input to the MUX 74. The channel data of CH1 and CH2 are subjected to time-division multiplexing by the MUX 73 to be converted to the data for transmission through a single line and are then transmitted toward the channel units 1A–12A through the data signal line 3R. Similarly, the channel data of the remaining six channels are subjected to time-division multiplexing by the MUX 74 and are output to the data inserting unit 75. At this time, in the MUX 73 and the MUX 74, the timing of loading the channel data into the shift registers 731 and 742–747 is controlled by the signal from the P/S timing generating unit 773 of the receiving-side channel pulse generating unit 77.

In the data inserting unit 75, the channel data of the six channels (CH3–CH8) other than the channel data of "CH1" and "CH2", which are output from the MUX 74, are inserted into empty slots of the timing pulses CCR1–CCR6, as already described with reference to FIG. 6 and FIG. 8, and are transmitted through the timing signal line 4R.

More specifically, in the data inserting unit 75, the channel data output from the shift registers 731 and 741–747 shown in FIG. 12, are superposed on the timing pulses CCR1–CCR 6, which are produced by the CCR pulse generating unit 772, by the selectors 751B–756B in accordance with the timing of the data/CCR pulse switching signal generated by the CCR pulse inserting timing generating unit 771, whereby the channel data of the six channels (CH3–CH8) are inserted into empty slots of the timing pulses CCR1–CCR6.

The timing pulses CCR1–CCR6 including the channel data of six channels which are inserted into the empty slots are temporarily latched by the flip flop circuit 751A to synchronize the signals, and then sent to the channel units 1A–12A through the timing signal line 4R.

Meanwhile, in each of the channel units 1A–12A, the channel data of the respective channels (CH1–CH8) input through the data signal line (VFR) 3R and the timing signal line 4R are extracted in the channel data extracting units 31R–38R while using the timing pulses CCR1–CCR6 and SHR1–SHR4 input through the timing signal line 4R to determine the timing of extraction.

More specifically, when the timing pulse SHR1 (or SHR2–SHR4) and the timing pulse CCR1 (or CCR3, CCR5) both become a "Low" level, a signal is output from the AND gate 51R shown in FIG. 9 so that the counter 411R successively outputs count values of 0–192 to the decoder 412R.

Subsequently, extracting timing signals are output from the decoder 412R and the bit holding unit 413R in accordance with the count value from the counter 411R. That is, when channel data are extracted from the signal input through the data signal line 3R, an extracting timing signal is generated to extract channel data of 16 bits, 8 bits at a time. When channel data are extracted from the timing pulse CCR1 (or CCR3, CCR5) input through the timing signal line 4R, another extracting timing signal is output to extract 4-bit data which have been inserted into the timing signal from the data starting positions "b1" and "b5", respectively. These extracting timing signals are output to the shift registers 301R–313R.

In the shift register 301R, data of 16 bits are extracted, 8 bits at a time, from the signal on the data signal line 3R in response to an extracting timing signal from the receiving-side timing generating unit 41R so that channel data corresponding to "CH1" and "CH2" are extracted.

In the remaining twelve shift registers 302R–313R, channel data corresponding to "CH3–CH8" are extracted in accordance with other extracting timing signals from the receiving-side timing generating unit 41R. That is, channel data for "CH3 (or CH5, CH7)" are extracted from the empty slots of the timing pulse CCR1 (or CCR3, CCR5) by the shift registers 302R and 303R (or shift registers 304R and 305R, shift registers 306R and 307R), and channel data for "CH4 (or CH6, CH8)" are extracted from the empty slots of the timing pulse CCR2 (or CCR4, CCR6) by the shift registers 308R and 309R (or shift registers 310R and 311R, shift registers 312R and 313R).

The channel data extracted as above are transmitted to subscribers corresponding to the channels (CH1–CH8).

As described above, in the signal processing apparatus according to the present embodiment, when channel data are sent from the channel units 1A–12A toward the multiplexing/demultiplexing unit 2B, channel data of the six channels CH3–CH8 are inserted into empty slots of the timing signals CCS1–CCS6 for transmission through the timing signal line 4S, in the data sending units 33S–38S of the sending system 10S. To conform the above processing, the channel data which have been inserted into the empty slots of the timing signals CCS1–CCS6 and transmitted to the multiplexing/demultiplexing unit 2B through the timing signal line 4S are separated from the timing pulses CCS1–CCS6 by the data separating unit 61 of the sending system 60.

Accordingly, the number of channels included in each of the channel units 1A–12A can be increased, for example, from two channels (CH1, CH2) to eight channels (CH1–CH8) extremely easily, without affecting the existing channels CH1 and CH2 and without installing additional channel units.

When channel data are transmitted from the multiplexing/demultiplexing unit 2B to the channel units 1A–12A, channel data for the six channels CH3–CH8 are inserted into empty slots of the timing signals CCS1–CCS6 for transmission through the timing signal line 4R, in the data inserting unit 75 of the receiving system 70 of the multiplexing/demultiplexing unit 2B. To conform the above processing, the channel data for the six channels CH3–CH8 which have been input to the channels units 1A–12A through the timing signal line 4R are extracted by the channel data extracting units 33R–38R of the receiving system 10R.

Accordingly, in this case, the number of channels included in each of the channel units 1A–12A can be increased, for example, from two channels (CH1, CH2) to eight channels (CH1–CH8) extremely easily, without affecting the existing channels CH1 and CH2 and without installing additional channel units.

In the present embodiment, the case has be described where the number of channels included in each of the channel units 1A–12A has been increased from two channels (CH1, CH2) to eight channels (CH1–CH8). However, the number of channels may be increased to a number greater than eight. In this case, the allocation of the time slots shown in FIG. 8 is modified according to the increase in the number of channels.

Figure 13:
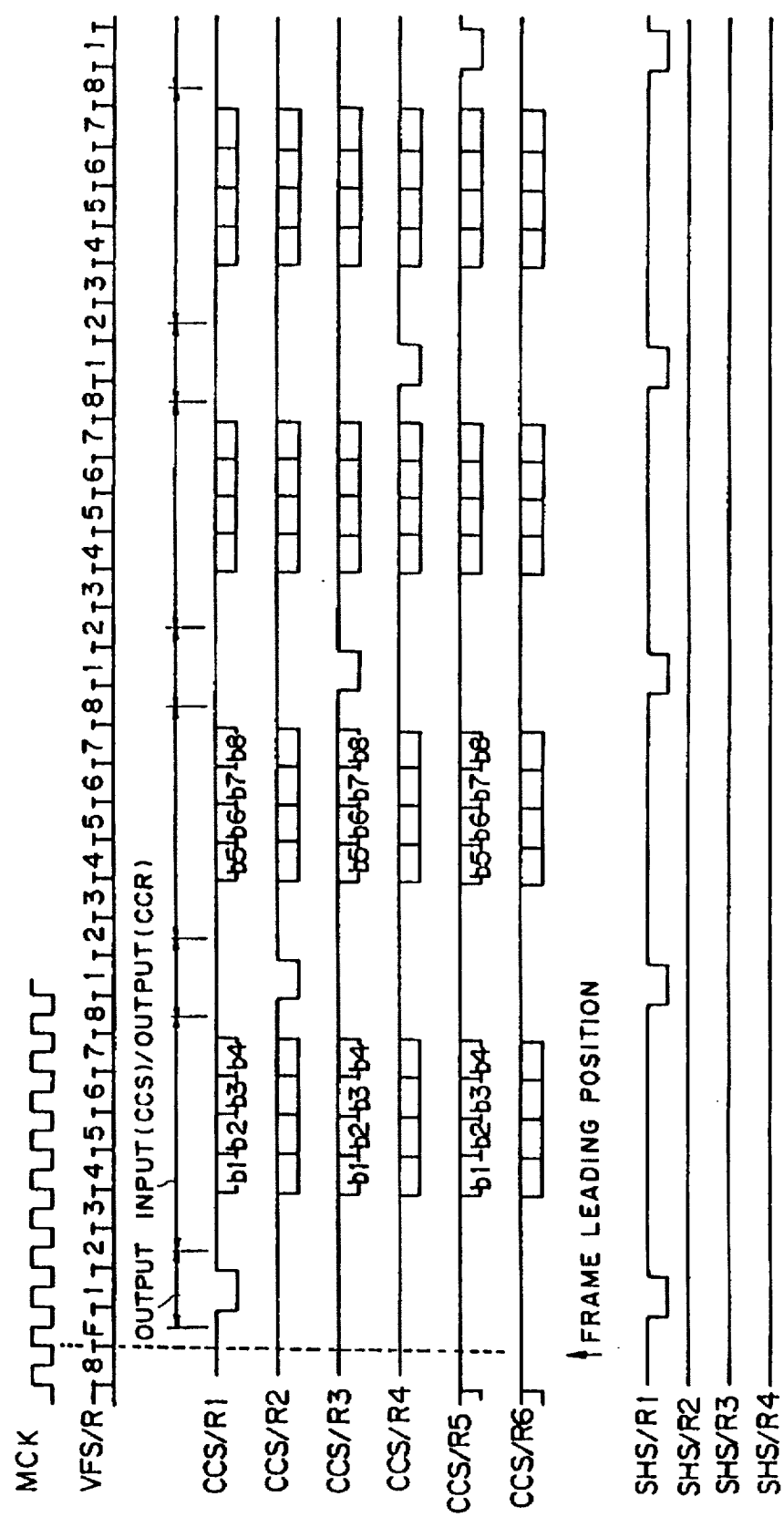
FIG. 13 is a chart for explaining another example of the operation for inserting channel data into the timing pulses in the signal processing apparatus of the embodiment.

Also, in the present embodiment, when channel data are inserted into empty slots of the timing pluses CCS(CCR)1–CCS(CCR)6, the frame leading position is shifted by 16 bits at a time to facilitate the detection of each frame leading position of channel data corresponding to each of the channel units 1A–12A, thereby greatly facilitating the insertion and separation of the channel data into and from the timing pulses CCS(CCR)1–CCS(CCR)6. However, as shown in FIG. 13, the frame leading position of channel data inserted into the timing signals may be made coincide with the frame leading position of channel data transmitted through the data signal line 3S (3R) (i.e., channel data for CH1, CH2).

Figure 14:
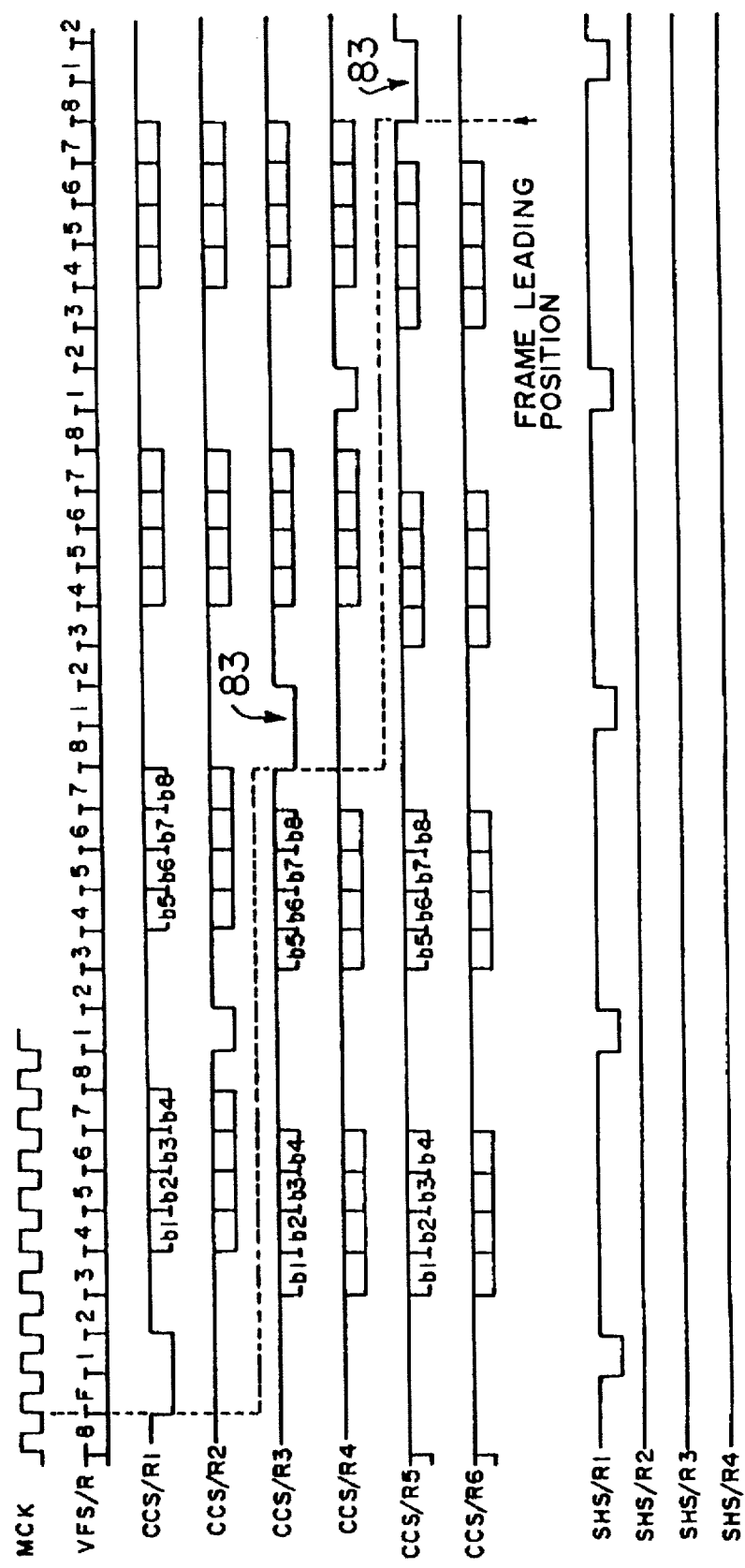
FIG. 14 is a chart for explaining still another example of the operation for inserting channel data into the timing pulses in the signal processing apparatus of the embodiment.
Figure 15:
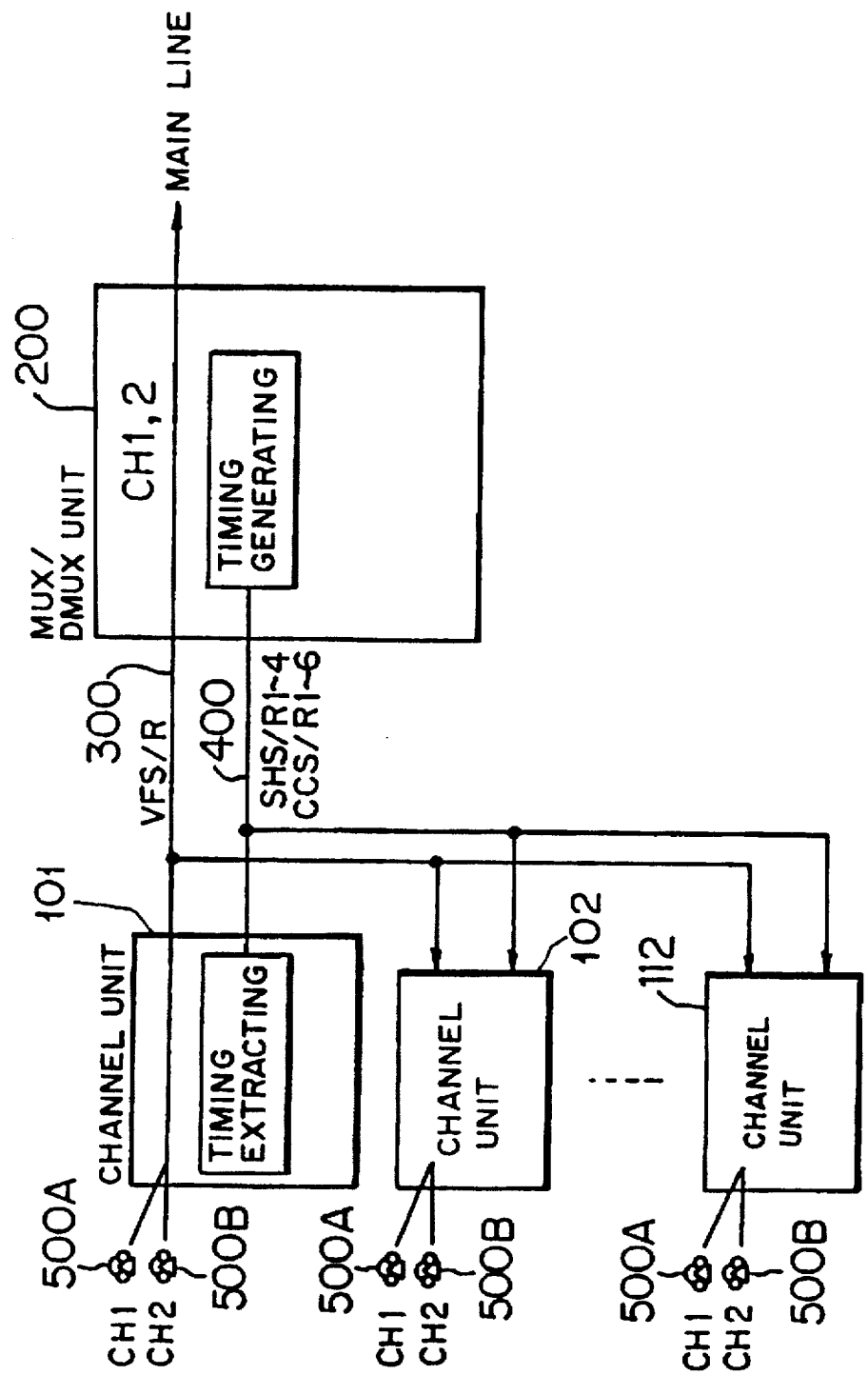
FIG. 15 is a block diagram showing the structure of a signal processing apparatus.
Figure 16:
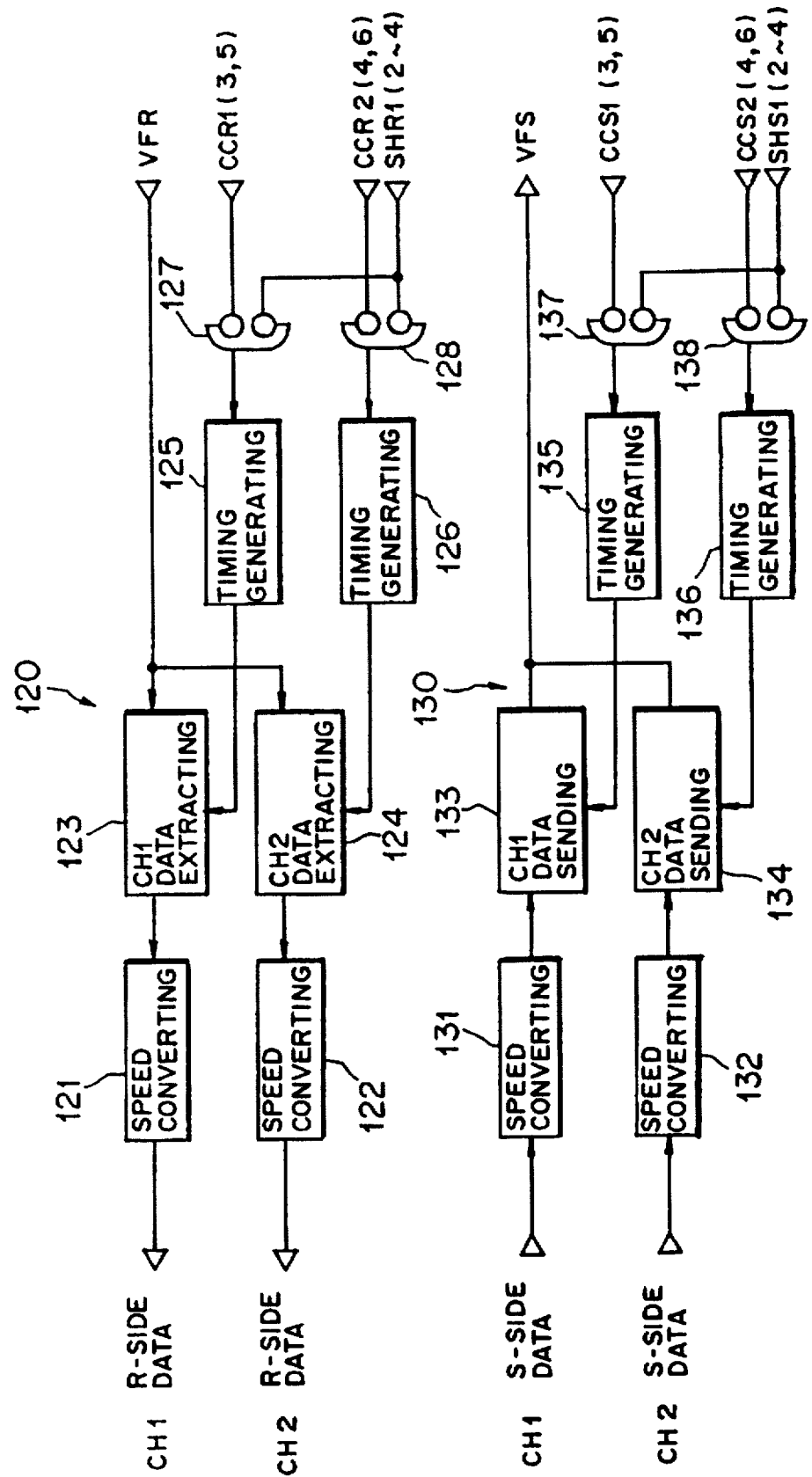
FIG. 16 is a block diagram showing the structure of a channel unit used in the signal processing apparatus shown in FIG. 15.
Figure 17:
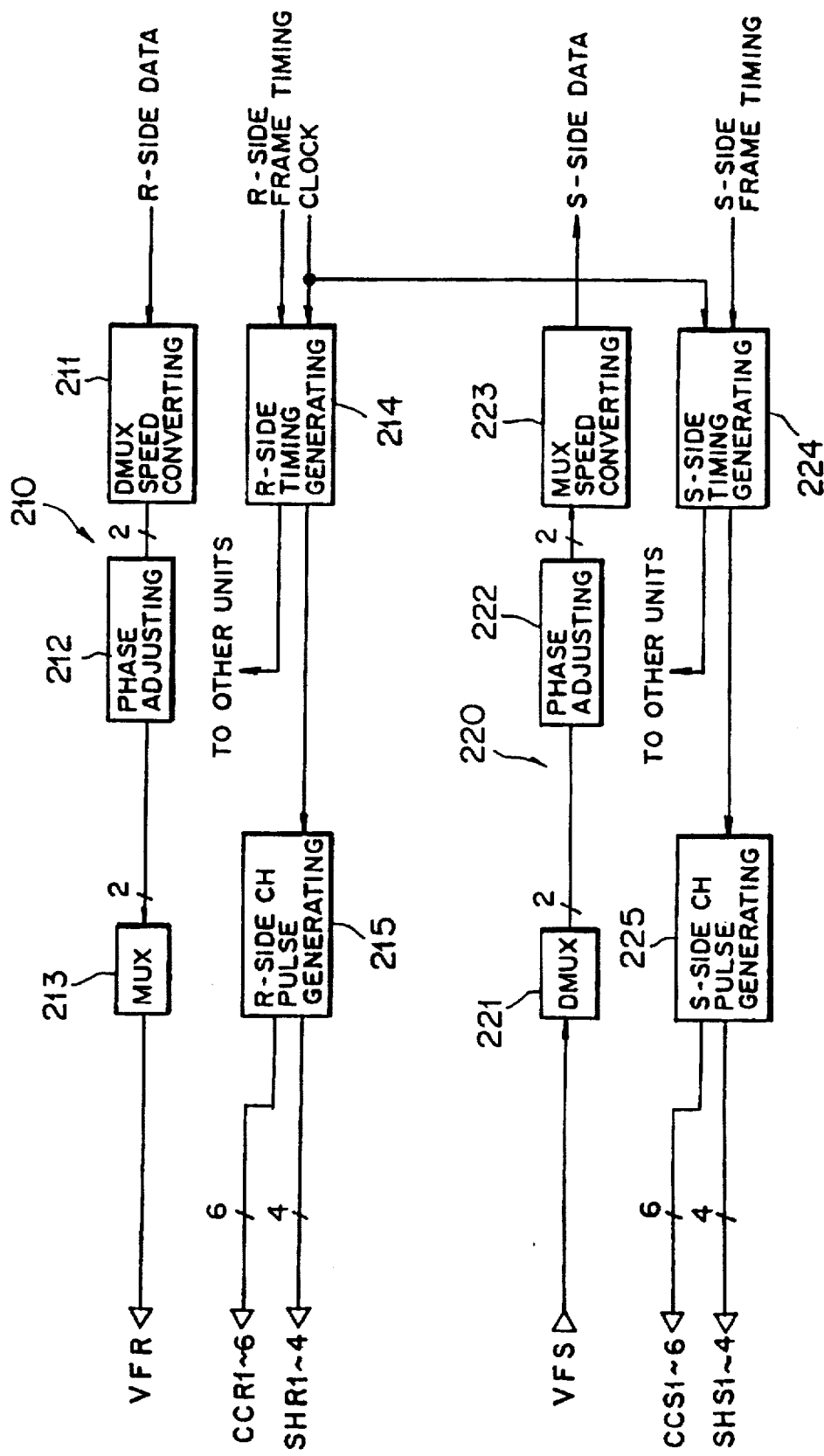
FIG. 17 is a block diagram showing the structure of the multiplexing/demultiplexing unit used in the signal processing apparatus shown in FIG. 15.
Figure 18:
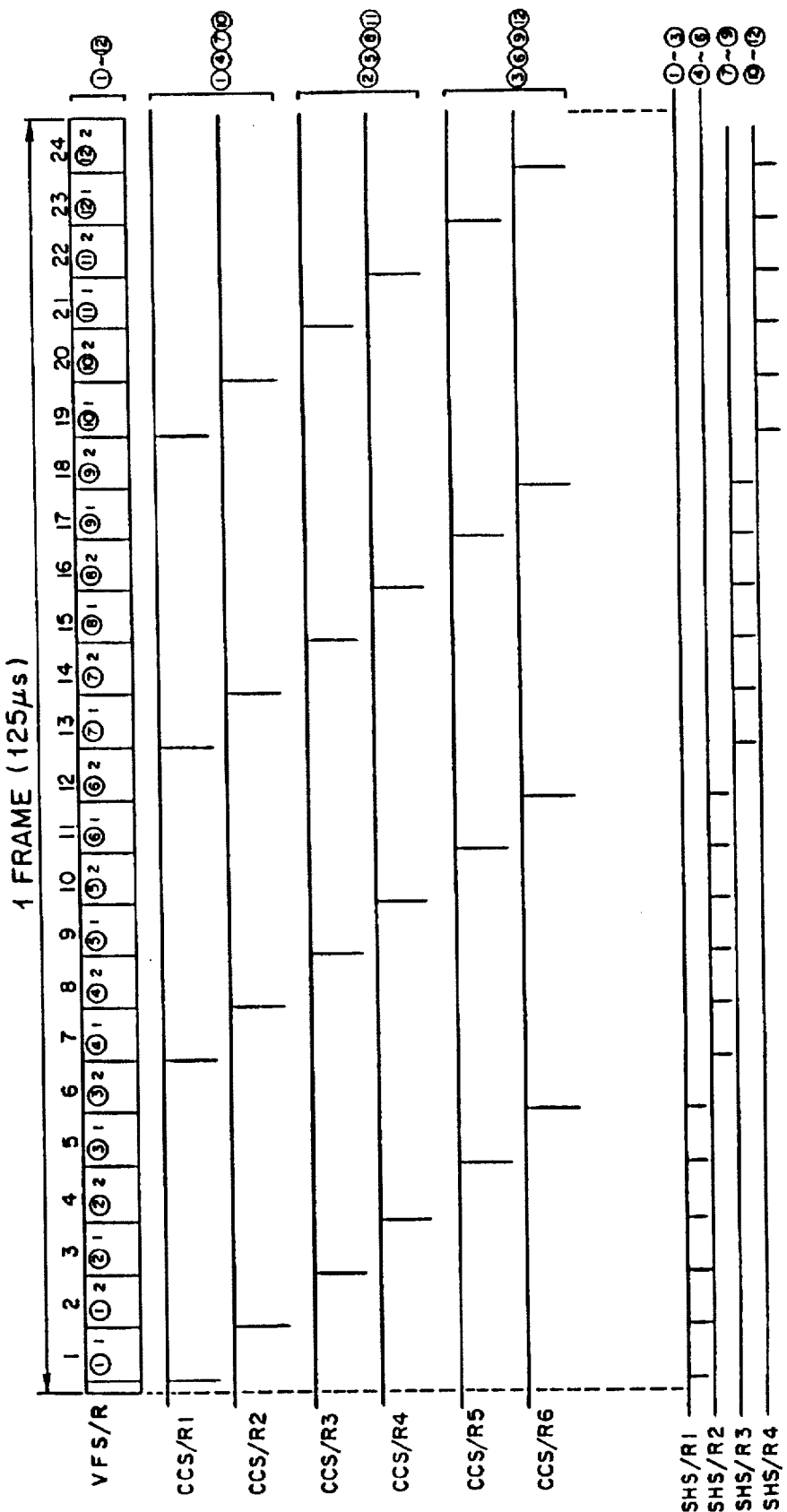
FIG. 18 is a chart for explaining the operation of the signal processing apparatus shown in FIG. 15.

In such a case, the frame leading position of channel data can be detected as shown in FIG. 14. For example, when a "Low" level signal indicating the frame leading position of the channel data inserted into the timing pulse CCS(CCR)1, CCS(CCR)3, CCS(CCR)5 and the ordinary timing pulse CCS(CCR)1, CCS(CCR)3, CCS(CCR)5 are continuously supplied to increase the width of the "Low" level signal to a width corresponding to 2 bits (see numeral 83), it becomes possible to easily detect that the position of the "Low" level signal with a 2-bit width represents the frame leading position of channel data of each of the channel units 1A–12A.

Here, the "Low" level signal with a 2-bit width is defined as a signal representing multiframe. Such a multiframe can be detected in each of the channel units 1A–2A when the "Low" level signal indicating the frame leading position of the channel data inserted into the timing pulse CCS(CCR)1, CCS(CCR)3, CCS(CCR)5 and the ordinary timing pulse CCS(CCR)1, CCS(CCR)3, CCS(CCR)5 are continuously supplied. Accordingly, the frame leading position of channel data can be easily detected in this case, Also, the signal processing apparatus may be modified such that multiframe information is inserted into channel data to be transmitted through the data signal line 3S (3R) and the channel data is then transmitted through the data signal line 3S (3R), that a signal indicating the frame leading position of channel data handled by each of the channel units 1A–12A (for example, a "Low" level signal) is transmitted through the timing signal line 4S (4R), and that in each of the channel units 1A–12A, the frame leading position of channel data to handled by the correspond channel unit is detected as a multiframe based on the "Low" level signal. In this case, the frame leading position of channel data corresponding to each of the channel units 1A–12A can be easily detected using ordinary timing pulses CCS1–CCS6 (CCR1–CCR6) only.

What is claimed is:

1. A signal processing apparatus which has a channel unit including a plurality of channels, a multiplexing unit for multiplexing a plurality of sets of channel data from said channel unit, a data signal line for transmitting the channel data from said channel unit to said multiplexing unit, and a timing signal line for transmitting timing signals from said multiplexing unit to said channel unit, wherein said channel unit comprises a plurality of channel data sending units to transmit the plurality of sets of channel data to said multiplexing unit while using the timing signals input through said timing signal line to determine the timing of sending out the data, part of said channel data sending units being connected to said data signal line so that channel data from part of said channel data sending units are transmitted to said multiplexing unit through said data signal line, and the rest of said channel data sending units being connected to said timing signal line so that channel data from the rest of said channel data sending units are inserted into empty slots of the timing signals and are transmitted to said multiplexing unit through said timing signal line; and said multiplexing unit comprises a channel data separating unit for separating the channel data from the timing signals transmitted through said timing signal line, and a channel data multiplexing unit for multiplexing the channel data transmitted through said data signal line and the channel data separated by said channel data separating unit.

2. The signal processing apparatus according to claim 1, wherein said channel unit comprises a sending timing signal generating unit which generates sending timing signals for said channel data sending units based on the timing signals input through said timing signal line.

3. The signal processing apparatus which has a channel unit including a plurality of channels, a demultiplexing unit for demultiplexing received data to obtain a plurality of sets of channel data to be transmitted to said channel unit, a data signal line for transmitting the channel data from said demultiplexing unit to said channel unit, and a timing signal line for transmitting timing signals from said demultiplexing unit to said channel unit, wherein said demultiplexing unit comprises a channel data demultiplexing unit for demultiplexing received data to obtain a plurality of sets of channel data to be transmitted to said channel unit, said demultiplexing unit having a structure such that part of the channel data separated by said channel data demultiplexing unit are transmitted through said data signal line, and the rest of the channel data separated by said channel data demultiplexing unit are inserted into empty slots of the timing signals and are transmitted through said timing signal line; and said channel unit comprises a plurality of channel data extracting units to extract the plurality of sets of channel data input through said data signal line and said timing signal line while using the timing signals input through said timing signal line to determine the timing of extraction.

4. The signal processing apparatus according to claim 3, wherein said channel unit comprises an extracting timing signal generating unit which generates extracting timing signals for said channel data extracting units based on the timing signals input through said timing signal line.

5. A signal processing apparatus which has a channel unit including a plurality of channels, a multiplexing/demultiplexing unit for multiplexing and separating a plurality of sets of channel data transmitted from or to said channel unit, a data signal line for transmitting the channel data between said channel unit and said multiplexing/demultiplexing unit, and a timing signal line for transmitting timing signals from said multiplexing/demultiplexing unit to said channel unit, wherein each of said channel unit and said multiplexing/demultiplexing unit comprises a channel data sending processing unit and a channel data receiving processing unit;

said channel data sending processing unit of said channel unit comprises a plurality of channel data sending units to transmit the plurality of sets of channel data to said multiplexing/demultiplexing unit while using the timing signals input through said timing signal line to determine the timing of sending out the data, part of said channel data sending units being connected to said data signal line so that channel data from part of said channel data sending units are transmitted to said multiplexing/demultiplexing unit through said data signal line, and the rest of said channel data sending units being connected to said timing signal line so that channel data from the rest of said channel data sending units are inserted into empty slots of the timing signals and are transmitted to said multiplexing/demultiplexing unit through said timing signal line;

said channel data receiving processing unit of said multiplexing/demultiplexing unit comprises a channel data separating unit for separating the channel data from the timing signals transmitted through said timing signal line, and a channel data multiplexing unit for multiplexing the channel data transmitted through said data signal line and the channel data separated by said channel data separating unit;

said channel data sending processing unit of said multiplexing/demultiplexing unit comprises a channel data demultiplexing unit for demultiplexing received data to obtain a plurality of sets of channel data to be transmitted to said channel unit, said demultiplexing unit having a structure such that part of the channel data separated by said channel data demultiplexing unit are transmitted through said data signal line, and the rest of the channel data separated by said channel data demultiplexing unit are inserted into empty slots of the timing signals and are transmitted through said timing signal line; and said channel data receiving processing unit of said channel unit comprises a plurality of channel data extracting units to extract the plurality of sets of channel data input through said data signal line and said timing signal line while using the timing signals input through said timing signal line to determine the timing of extraction.

6. The signal processing apparatus according to claim 5, wherein said channel data sending processing unit of said channel unit comprises a sending timing signal generating unit which generates sending timing signals for said channel data sending units based on the timing signals input through said timing signal line, and said channel data receiving processing unit of said channel unit comprises an extracting timing signal generating unit which generates extracting timing signals for said channel data extracting units based on the timing signals input through said timing signal line.

7. A signal processing method for a signal processing apparatus which has a plurality of channel units each including a plurality of channels, a multiplexing/demultiplexing unit for multiplexing and separating a plurality of sets of channel data transmitted between said channel units, a data signal line for transmitting the channel data between said channel units and said multiplexing/demultiplexing unit, and a timing signal line for transmitting timing signals from said multiplexing/demultiplexing unit to said channel units, said method comprising the steps of:

transmitting part of the plurality of sets of channel data from each channel unit to said multiplexing/demultiplexing unit through said data signal line;

inserting the rest of the plurality of sets of channel data into empty slots of the timing signals so as to transmit them to said multiplexing/demultiplexing unit through said timing signal line;

separating, in said multiplexing/demultiplexing unit, the channel data from the timing signals transmitted through said timing signal line;

multiplexing the separated channel data and the channel data transmitted through said data signal line;

separating, in said multiplexing/demultiplexing unit, received data to obtain a plurality of sets of channel data;

transmitting part of the separated channel data through said data signal line;

inserting the rest of the separated channel data into empty slots of the timing signals and transmitting through said timing signal line; and extracting, in each channel unit, the plurality of sets of channel data input through said data signal line and said timing signal line while using the timing signals input through said timing signal line to determine the timing of extraction.

8. The signal processing method according to claim 7, wherein said plurality of channel units are divided into a plurality of groups, and the leading positions of said plurality sets of channel data handled by channel units forming each group are made coincide with each other while the leading positions of said plurality sets of channel data handled by channel units forming another group are shifted by a predetermined amount.

9. The signal processing method according to claim 7, wherein a signal indicating the leading position of channel data handled by each channel unit and timing signals are continuously supplied.

10. The signal processing method according to claim 7, wherein a signal indicating the leading position of channel data handled by said channel units and a part of said plurality of kinds of timing signals are continuously supplied.

11. The signal processing method according to claim 10, wherein when said signal indicating the leading position of channel data handled by each channel unit and said part of plurality of kinds of timing signals are continuously supplied, the existence of a multiframe is detected in said channel unit.

12. The signal processing method according to claim 7, wherein multiframe information is inserted into channel data, the channel data is transmitted from said multiplexing/demultiplexing unit to said channel units through said data signal line, a signal representing the leading position of channel data handled by said channel units is transmitted to said channel units through said timing signal line, and the existence of a multiframe is detected in said channel units based on said signal.

* * * * *